United States Patent
Kang et al.

(10) Patent No.: US 12,323,829 B2
(45) Date of Patent: Jun. 3, 2025

(54) APPARATUS AND METHOD FOR CONTROLLING SIDELINK AUXILIARY CARRIER IN WIRELESS COMMUNICATION SYSTEM

(71) Applicant: Samsung Electronics Co., Ltd., Suwon-si (KR)

(72) Inventors: Hyunjeong Kang, Suwon-si (KR); Anil Agiwal, Suwon-si (KR); Sangkyu Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 301 days.

(21) Appl. No.: 17/759,844

(22) PCT Filed: Jan. 29, 2021

(86) PCT No.: PCT/KR2021/001213
§ 371 (c)(1),
(2) Date: Jul. 29, 2022

(87) PCT Pub. No.: WO2021/154030
PCT Pub. Date: Aug. 5, 2021

(65) Prior Publication Data
US 2023/0128455 A1   Apr. 27, 2023

(30) Foreign Application Priority Data
Jan. 31, 2020   (KR) .................. 10-2020-0011928

(51) Int. Cl.
*H04W 24/00* (2009.01)
*H04W 24/04* (2009.01)
*H04W 76/19* (2018.01)

(52) U.S. Cl.
CPC ........... *H04W 24/04* (2013.01); *H04W 76/19* (2018.02)

(58) Field of Classification Search
CPC ....... H04B 17/24; H04L 1/189; H04L 1/1896; H04L 41/06; H04L 69/40; H04W 4/44;
(Continued)

(56) References Cited

U.S. PATENT DOCUMENTS

| 2019/0081691 A1 | 3/2019 | Nagaraja et al. |
| 2019/0253927 A1 | 8/2019 | Mok et al. |

(Continued)

FOREIGN PATENT DOCUMENTS

| CN | 110383917 A | 10/2019 |
| CN | 110710246 A | 1/2020 |

(Continued)

OTHER PUBLICATIONS

Inter Digital Inc., RLM/RLF for NR V2X, 3GPP RAN WG2 Meeting #106, R2-1906387, 3 pages, May 2019.*
European Patent Office, "Supplementary Partial European Search Report," dated Jun. 2, 2023, in connection with European Patent Application No. 21747661.3, 19 pages.

(Continued)

*Primary Examiner* — Frank Duong

(57) ABSTRACT

Provided is a first terminal for performing unicast communication between terminals in a wireless communication system. The first terminal may be configured to: transmit a packet to a second terminal through a first sidelink carrier; determine a failure of the first sidelink carrier based on at least one of a number of times of retransmission of the transmitted packet, a number of times of reception of hybrid automatic repeat request (HARQ) negative acknowledgement (NACK) or discontinuous transmission (DTX) for the transmitted packet, or a number of times of continuous out of synch (OOS) for the first sidelink carrier; and determine whether to perform a radio link failure (RLF) handling procedure or whether to perform a carrier failure handling procedure, based on a result of the determining of the failure and the first sidelink carrier, wherein the carrier failure handling procedure may be performed based on at least one (Continued)

of a connection state between the first terminal and a base station or a need for multi-carrier transmission.

15 Claims, 27 Drawing Sheets

(58) Field of Classification Search
CPC ....... H04W 4/46; H04W 24/04; H04W 24/08; H04W 36/0055; H04W 72/00; H04W 76/14; H04W 76/18; H04W 76/19; H04W 76/23; H04W 76/27; H04W 76/28; H04W 92/18
See application file for complete search history.

(56) References Cited

U.S. PATENT DOCUMENTS

| | | | |
|---|---|---|---|
| 2019/0280911 A1 | 9/2019 | Jung et al. | |
| 2019/0281588 A1 | 9/2019 | Zhang et al. | |
| 2020/0015230 A1 | 1/2020 | Chae et al. | |
| 2020/0127886 A1 | 4/2020 | Tang | |
| 2020/0229007 A1* | 7/2020 | Jung | H04W 76/10 |
| 2020/0236730 A1* | 7/2020 | Shin | H04W 56/001 |
| 2020/0252989 A1* | 8/2020 | Chen | H04W 76/19 |
| 2020/0351682 A1* | 11/2020 | Cirik | H04W 76/28 |
| 2020/0351959 A1* | 11/2020 | Lee | H04W 80/02 |
| 2021/0014711 A1* | 1/2021 | Miao | H04W 4/40 |
| 2021/0051500 A1* | 2/2021 | Chae | H04L 5/0048 |
| 2021/0136856 A1* | 5/2021 | Tseng | H04W 76/14 |
| 2022/0150730 A1* | 5/2022 | Freda | H04W 24/04 |
| 2022/0191962 A1* | 6/2022 | Di Girolamo | H04L 5/0053 |
| 2022/0201558 A1* | 6/2022 | Lee | H04W 72/20 |
| 2022/0279617 A1* | 9/2022 | Orsino | H04W 76/15 |
| 2022/0338301 A1* | 10/2022 | Park | H04W 4/40 |

FOREIGN PATENT DOCUMENTS

| | | | |
|---|---|---|---|
| WO | 2012079197 A1 | 6/2012 | |
| WO | 2019018989 A1 | 1/2019 | |
| WO | 2019022470 A1 | 1/2019 | |
| WO | 2019099550 A1 | 5/2019 | |
| WO | 2019138087 A1 | 7/2019 | |

OTHER PUBLICATIONS

LG Electronics, "Remaining issues on PC5 Rlm," 3GPP TSG-RAN WG2 Meeting #108, R2-1915515, Reno, NV, USA, Nov. 2019, 3 pages.
Huawei et al., "Considerations on RLM for NR V2X unicast," 3GPP TSG-RAN WG2 Meeting #107, R2-19xxxxx (revision of R2-1907419) Prague, Czech Republic, Aug. 2019, 5 pages.
International Search Report and Written Opinion of the International Searching Authority dated Apr. 27, 2021, in connection with International Application No. PCT/KR2021/001213, 11 pages.
Ericsson, "RLF handling in sidelink," 3GPP TSG-RAN WG2 #107, R2-1910133, Prague, Czech Republic, Aug. 26-30, 2019, 5 pages.
Ericsson (Rapporteur), "Summary of email discussion [107#75][NR/V2X] RLF," 3GPP TSG-RAN WG2 #107bis, R2-1913328, Chongqing, China, Oct. 14-18, 2019, 26 pages.
MediaTek Inc., "Link management for unicast," 3GPP TSG-RAN WG2 Meeting #105, R2-1901063, Athens, Greece, Feb. 25-Mar. 1, 2019, 4 pages.
Lenovo et al., "Radio link maintenance for NR V2X unicast," 3GPP TSG-RAN WG2 Meeting #105, R2-1901002, Athens, Greece, Feb. 25-Mar. 1, 2019, 3 pages.
Supplementary European Search Report dated Aug. 30, 2023, in connection with European Patent Application No. 21747661.3, 20 pages.
The First Office Action dated Mar. 21, 2024, in connection with Chinese Patent Application No. 202180024673.9, 26 pages.
Zte et al., "Discussion on AS level link management for unicast", R1-1905329, 3GPP TSG RAN WG1 Meeting #96bis, Xi''an, China, Apr. 8-12, 2019, 2 pages.
3GPP TS 36.331 V15.1.0 (Mar. 2018), Technical Specification, 3rd Generation Partnership Project; Technical Specification Group Radio Access Network; Evolved Universal Terrestrial Radio Access (E-UTRA); Radio Resource Control (RRC); Protocol specification (Release 15), Mar. 2018, 786 pages.
Notice of Allowance issued Sep. 27, 2024, in connection with CN Patent Application No. 202180024673.9, 8 pages.
LG Electronics, "Status report of SI: Study on NR V2X; rapporteur: LG Electronics," RP-190225, 3GPP TSG RAN meeting #83, Mar. 2019, 29 pages.

\* cited by examiner

FIG. 15A

| $S_7$ | $S_6$ | $S_5$ | $S_4$ | $S_3$ | $S_2$ | $S_1$ | $S_0$ | Si: Sidelink DRBi

FIG. 15B

| PC5-RRC | PC5-S | Reserved | | | | | |
|---|---|---|---|---|---|---|---|
| $S_7$ | $S_6$ | $S_5$ | $S_4$ | $S_3$ | $S_2$ | $S_1$ | $S_0$ |

Si: Sidelink DRBi

APPARATUS AND METHOD FOR CONTROLLING SIDELINK AUXILIARY CARRIER IN WIRELESS COMMUNICATION SYSTEM

CROSS-REFERENCE TO RELATED APPLICATIONS

This application is a 371 of International Application No. PCT/KR2021/001213, filed Jan. 29, 2021, which claims priority to Korean Patent Application No. 10-2020-0011928, filed Jan. 31, 2020, the disclosures of which are herein incorporated by reference in their entirety.

BACKGROUND

1. Field

Various embodiments of the disclosure relate to a wireless communication system, and more particularly, to a method and apparatus in which a terminal controls a sidelink carrier in a wireless communication system.

2. Description of Related Art

To meet the ever-increasing demand with respect to wireless data traffic since the commercialization of the 4th generation (4G) communication system, there have been efforts to develop an advanced 5th generation (5G) or pre-5G communication system. For this reason, the 5G or pre-5G communication system is also called a beyond 4G network communication system or post long term evolution (LTE) system.

In order to achieve a high data rate, consideration is given to implementing 5G communication systems in ultra-high frequency (millimeter-wave (mmWave)) bands, e.g., 60 GHz bands. To reduce path loss of radio waves and increase a transmission range of radio waves in the ultra-high frequency bands, beamforming, massive multiple-input multiple-output (MIMO), full dimensional MIMO (FD-MIMO), array antenna, analog beamforming, and large-scale antenna techniques are under discussion.

To improve system networks, technologies for advanced small cells, cloud radio access networks (RANs), ultra-dense networks, device to device (D2D) communication, wireless backhaul, moving networks, cooperative communication, coordinated multi-points (CoMP), reception-end interference cancellation and the like have also been developed in the 5G communication system.

In addition, in the 5G system, an advanced coding modulation (ACM) method, e.g., hybrid frequency-shift keying (FSK) and quadrature amplitude modulation (QAM) (FQAM), sliding window superposition coding (SWSC), and advanced access technology, e.g., filter bank multi carrier (FBMC), non-orthogonal multiple access (NOMA), and sparse code multiple access (SCMA), have been developed.

The Internet has evolved from a human-centered connection network, through which humans generate and consume information, to an Internet of things (IoT) network that exchanges and processes information between distributed components, such as objects. Internet of everything (IoE) technology in which big data processing technology via a connection with a cloud server or the like is combined with the IoT technology has also emerged. To implement the IoT, various technological elements, such as sensing technology, wired/wireless communication and network infrastructures, service interface technology, and security technology, are required, such that, in recent years, technologies related to sensor networks for connecting objects, machine-to-machine (M2M) communication, and machine-type communication (MTC) have been studied. In the IoT environment, intelligent information technology (IT) services may be provided to collect and analyze data obtained from objects connected to each other to create new value in human life. The IoT may be applied to fields, such as smart homes, smart buildings, smart cities, smart cars or connected cars, smart grids, health care, smart home appliances, and advanced medical services, through convergence and integration of existing IT and various industries.

In this regard, various attempts to apply the 5G communication system to the IoT network have been made. For example, technologies regarding sensor network, M2M, MTC, etc., are implemented by the 5G communication technologies, such as beamforming, MIMO, and array antennas. The application of a cloud RAN as big data processing technology may also be considered as an example of convergence between 5G technology and IoT technology.

In addition, terminal direct communication (sidelink communication) using 5G communication systems has been studied, and the terminal direct communication is applied to, e.g., vehicle-to-everything (hereinafter, referred to as 'V2X'), and is expected to provide various services to users.

As described above, as various services may be provided according to the development of wireless communication systems, in particular, methods for effectively controlling sidelink secondary carriers are required.

SUMMARY

Various embodiments of the disclosure provide an apparatus and method in which a terminal controls a sidelink carrier in a wireless communication system.

The disclosure may provide a first terminal for performing unicast communication between terminals in a wireless communication system. The first terminal may be configured to: transmit a packet to a second terminal through a first sidelink carrier; determine a failure of the first sidelink carrier based on at least one of a number of times of retransmission of the transmitted packet, a number of times of reception of hybrid automatic repeat request (HARQ) negative acknowledgement (NACK) for the transmitted packet, or a number of times of continuous out of synch (OOS) for the first sidelink carrier; and determine whether to perform a radio link failure (RLF) handling procedure or whether to perform a carrier failure handling procedure, based on a result of the determining of the failure and the first sidelink carrier, wherein the carrier failure handling procedure may be performed based on at least one of a connection state between the first terminal and a base station or a need for multi-carrier transmission.

BRIEF DESCRIPTION OF THE DRAWINGS

FIGS. 15A and 15B are diagrams illustrating a format of a media access control (MAC) control element (CE), according to an embodiment of the disclosure.

DETAILED DESCRIPTION

Figure 1:
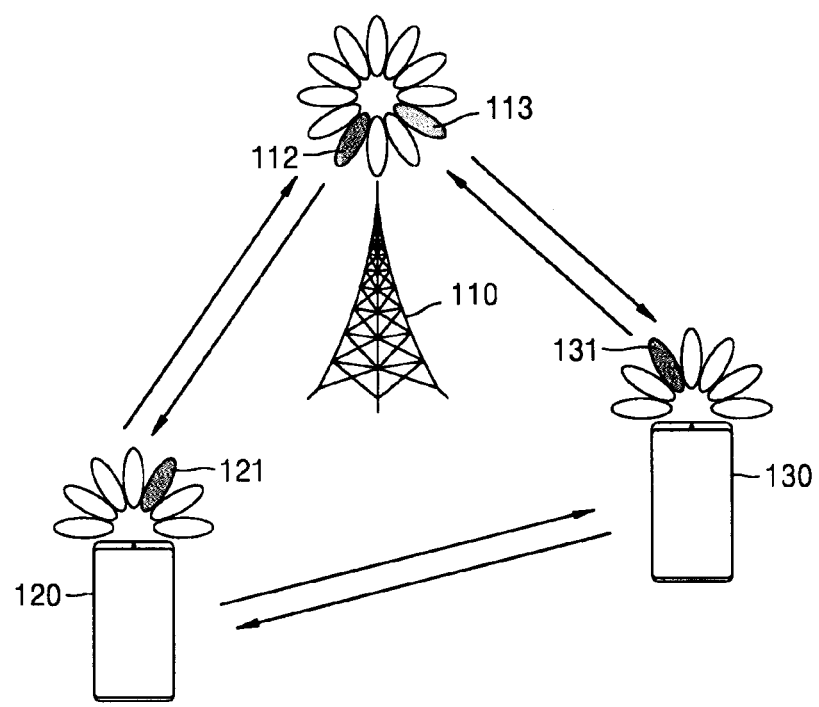
FIG. 1 illustrates a wireless communication system according to an embodiment of the disclosure.

Embodiments of the disclosure may provide a first terminal for performing unicast communication between terminals in a wireless communication system. The first terminal may include a transceiver, and at least one processor configured to: transmit a packet to a second terminal through a first sidelink carrier; determine a failure of the first sidelink carrier based on at least one of a number of times of retransmission of the transmitted packet, a number of times of reception of hybrid automatic repeat request (HARQ) negative acknowledgement (NACK) for the transmitted packet, a number of times of reception of HARQ discontinuous transmission (DTX) for the transmitted packet, or a number of times of continuous out of synch (OOS) for the first sidelink carrier; and determine whether to perform a radio link failure (RLF) handling procedure or whether to perform a carrier failure handling procedure, based on a result of the determining of the failure and the first sidelink carrier, wherein the carrier failure handling procedure may be performed based on at least one of a connection state between the first terminal and a base station or a need for multi-carrier transmission.

In an embodiment, the at least one processor of the first terminal may be further configured to: identify whether the first sidelink carrier is a primary carrier or a secondary carrier; when the first sidelink carrier is identified as the primary carrier, perform the RLF handling procedure based on the result of the determining of the failure; and when the first sidelink carrier is identified as the secondary carrier, perform the carrier failure handling procedure based on the result of the determining of the failure.

In an embodiment, the at least one processor of the first terminal may be further configured to: determine whether a second sidelink carrier through which a packet is transmittable to the second terminal exists, based on the result of the determining of the failure; when the second sidelink carrier does not exist, perform the RLF handling procedure; and when the second sidelink carrier exists, perform the carrier failure handling procedure for the first sidelink carrier.

In an embodiment, the at least one processor of the first terminal may be further configured to: when the carrier failure handling procedure is performed, identify the connection state between the first terminal and the base station; when the first terminal is connected to the base station, transmit a first failure report message regarding the first sidelink carrier to the base station and receive configuration information regarding a new carrier from the base station; and when the first terminal is not connected to the base station, perform a carrier selection or reselection procedure, wherein the first failure report message may include at least one of an identifier of the first sidelink carrier, radio bearer information regarding the first sidelink carrier, logical channel information regarding the first sidelink carrier, a channel congestion level measurement result for a transmission resource pool of the first sidelink carrier, or a packet reception ratio of the first sidelink carrier.

In an embodiment, the at least one processor of the first terminal may be further configured to suspend use of the first sidelink carrier based on at least one of whether the configuration information for the new carrier is received from the base station or the need for multi-carrier transmission, wherein the suspending of the use of the first sidelink carrier may be performed before the connection state between the first terminal and the base station is identified, before the first failure report message is transmitted to the base station, or before the carrier selection or reselection procedure is performed.

In an embodiment, the at least one processor of the first terminal may be further configured to: when the first terminal is not connected to the base station, identify the need for the multi-carrier transmission; and perform the carrier selection or reselection procedure based on the identified need for the multi-carrier transmission.

In an embodiment, the at least one processor of the first terminal may be further configured to: when the carrier failure handling procedure is performed, determine whether an available carrier exists according to a carrier selection or reselection procedure; when the available carrier exists, transmit the packet to the second terminal through the available carrier; when the available carrier does not exist, identify the connection state between the first terminal and the base station; when the first terminal is connected to the base station, transmit a first failure report message of the first sidelink carrier to the base station; and when the first terminal is not connected to the base station, perform the carrier selection or reselection procedure.

In an embodiment, the at least one processor of the first terminal may be further configured to: suspend use of the first sidelink carrier; and after the use of the first sidelink carrier is suspended, determine whether the available carrier exists according to the carrier selection or reselection procedure.

In an embodiment, the carrier selection or reselection procedure may be performed based on at least one of a carrier selection condition for a logical channel, a carrier selection condition for a sidelink flow, a carrier selection condition for a sidelink bearer, a channel congestion level, reliability of the sidelink flow, reliability of the sidelink bearer, or sidelink signal quality.

In an embodiment, the at least one processor of the first terminal may be further configured to: determine that the first sidelink carrier in which the failure is determined is used for the unicast communication; and transmit a second failure report message for the first sidelink carrier to the second sidelink carrier, based on the first sidelink carrier and a result of determining that the first sidelink carrier is used for the unicast communication.

In an embodiment, the at least one processor of the first terminal may be further configured to: identify that a new carrier for the unicast communication exists, based on a result of the transmitting of the second failure report message to the second terminal; and transmit information regarding the identified new carrier to the second terminal.

In an embodiment, the second failure report message may include at least one of an identifier notifying transmission suspension, an identifier of the first sidelink carrier, radio bearer information regarding the first sidelink carrier, or logical channel information regarding the first sidelink carrier.

In an embodiment, the second failure report message may be transmitted in a medium access control (MAC) control element (CE) format, and may indicate mapping of a carrier corresponding to a signaling radio bearer (SRB) corresponding to PC5-radio resource control (RRC) or an SRB corresponding to PC5-S signaling.

Embodiments of the disclosure may provide a base station for transmitting/receiving a signal to/from a terminal supporting sidelink communication in a wireless communication system. The base station may include a transceiver, and at least one processor configured to: receive a first failure report message from the terminal, the first failure report message including information regarding a failure of a first sidelink carrier; configure carrier configuration information based on the received first failure report message, sidelink capability information regarding the terminal, and channel congestion level information; and transmit the carrier configuration information to the terminal, wherein the carrier configuration information may include at least one of a carrier list, a reference parameter related to activation of duplicate transmission, transmission power, a modulation and coding scheme (MCS) level, a number of times of packet retransmission, a number of times of transmission of hybrid automatic repeat request (HARQ) discontinuous transmission (DTX), or a number of times of retransmission of HARQ negative acknowledgement (NACK).

Embodiments of the disclosure may provide an operating method of a first terminal for performing unicast communication between terminals in a wireless communication system. The operating method may include: transmitting a packet to a second terminal through a first sidelink carrier; determining a failure of the first sidelink carrier based on at least one of a number of times of retransmission of the transmitted packet, a number of times of reception of hybrid automatic repeat request (HARQ) discontinuous transmission (DTX) for the transmitted packet, a number of times of reception of HARQ negative acknowledgement (NACK) for the transmitted packet, or a number of times of continuous out of synch (OOS) for the first sidelink carrier; and determining whether to perform a radio link failure (RLF) handling procedure or whether to perform a carrier failure handling procedure, based on a result of the determining of the failure and the first sidelink carrier, wherein the carrier failure handling procedure may be performed based on at least one of a connection state between the first terminal and a base station or a need for multi-carrier transmission.

Hereinafter, exemplary embodiments of the disclosure will be described in detail with reference to accompanying drawings. In the accompanying drawings, it will be understood that like reference numerals denote like components. Also, detailed descriptions of well-known functions and configurations in the art are omitted when it is deemed that they may unnecessarily obscure the essence of the disclosure.

In the following descriptions of embodiments in the specification, descriptions of techniques that are well known in the art and are not directly related to the disclosure are omitted. This is to clearly convey the gist of the disclosure by omitting an unnecessary explanation.

For the same reasons, some components may be exaggerated, omitted, or schematically illustrated in the accompanying drawings. Also, the size of each component does not entirely reflect the actual size. In each drawing, components that are the same or are in correspondence are rendered the same reference numeral.

Advantages and features of the disclosure and methods of accomplishing the same may be understood more readily by reference to the following detailed description of the embodiments and the accompanying drawings. The embodiments of the disclosure may, however, be embodied in many different forms and should not be construed as limited to the embodiments set forth herein. Rather, these embodiments of the disclosure are provided so that this disclosure will be thorough and complete, and will fully convey the scope of the embodiments of the disclosure to those of ordinary skill in the art. Therefore, the scope of the disclosure will only be defined by the appended claims. In the specification, the same components are denoted by the same reference numerals.

In this regard, it will be understood that combinations of blocks in flowcharts or process flow diagrams may be performed by computer program instructions. Because these computer program instructions may be loaded into a processor of a general-purpose computer, a special purpose computer, or another programmable data processing device, the instructions, which are executed via the processor of the computer or the other programmable data processing device generate means for implementing functions specified in the flowchart block(s). Because these computer program instructions may also be stored in a computer-usable or computer-readable memory that may direct a computer or another programmable data processing device to function in a particular manner, the instructions stored in the computer-usable or computer-readable memory may produce an article of manufacture including instruction means that implement the functions specified in the flowchart block(s). Because the computer program instructions may also be loaded onto a computer or another programmable data processing device, a series of operational steps may be performed on the computer or the other programmable device to produce a computer implemented process, and thus the instructions executed on the computer or the other programmable device may provide steps for implementing the functions specified in the flowchart block(s).

In addition, each block of the flowchart illustrations may represent a module, a segment, or a portion of code, which includes one or more executable instructions for performing specified logical function(s). It should also be noted that in some alternative implementations, the functions noted in the blocks may occur out of the order. For example, two successive blocks may be performed substantially at the same time or in reverse order, depending upon the functionality involved.

Furthermore, the term 'unit' or ' . . . er/or' used in the embodiments refers to a software or hardware component, such as a field programmable gate array (FPGA) or an application specific integrated circuit (ASIC), which plays a certain role. However, the term 'unit' or ' . . . er/or' is not limited to software or hardware. The term 'unit' or ' . . . er/or' may be configured in an addressable storage medium or may be configured to reproduce one or more processors. Thus, for example, the term 'units' or ' . . . ers/ors' may refer to components, such as software components, object-oriented software components, class components, and task components, and may include processes, functions, attributes, procedures, subroutines, segments of program code, drivers, firmware, microcode, circuits, data, a database, data structures, tables, arrays, and variables. The functionality provided in components and 'units' or ' . . . ers/ors' may be combined into fewer components and 'units' or ' . . . ers/ors' or may be further separated into additional components and 'units' or ' . . . ers/ors'. Further, the components and 'units' or ' . . . ers/ors' may be implemented to operate one or more central processing units (CPUs) in a device or a secure multimedia card.

When particularly describing the embodiments of the disclosure, a new radio access network (RAN) (NR) that is a radio access network and a packet core (a 5th generation (5G) system, a 5G core network, or a next-generation (NG) core) that is a core network in 5G mobile communication standards defined by the 3rd Generation Partnership Project (3GPP) that is a mobile communication standard organizing group are main targets, but the essential concept of the disclosure may be modified without departing from the scope of the disclosure and may be applied to other communication systems based on similar technical backgrounds, and the application may be made based on determination by one of ordinary skill in the art.

In the 5G system, a network data collection and analysis function (NWDAF) may be defined to support network automation, the NWDAF referring to a network function for providing a function to analyze and provide data collected over a 5G network. The NWDAF may collect/store/analyze information from the 5G network and may provide a result to an unspecified network function (NF), and a result of the analysis may be independently used by each NF.

Hereinafter, for convenience of description, the disclosure may use some of terms and names defined in the 3GPP long term evolution (LTE) standards (standards of 5G, new radio (NR), LTE, or similar systems). However, the disclosure is not limited to these terms and names, and may be equally applied to communication systems conforming to other standards.

The disclosure provides an apparatus and method in which a terminal (user equipment (UE)) handles a failure that may occur while at least one sidelink (SL) carrier is used, the UE performing transmission/reception based on SL unicast, SL groupcast, and SL broadcast in a wireless communication system.

Hereinafter, the disclosure relates to a method and apparatus of controlling an SL secondary carrier in a wireless communication system. In detail, the disclosure is for a UE to handle a failure occurring in a carrier when at least one carrier is used, in order to support SL communication between UEs, and the disclosure may include operations of a UE and a base station (BS) for determining a failure of a carrier used for duplicate transmission of an SL multi-carrier, and handling the failure of the carrier. According to an embodiment of the disclosure, in order to perform direct communication between UEs through an SL, the UE handles a failure occurring in a carrier and continuously transmits/receives data through the SL, such that the reliability of transmission/reception may be enhanced.

As used in the following description, the terms indicating signals, terms indicating channels, terms indicating control information, terms indicating network entities, and terms indicating components of devices are exemplified for convenience of description. Accordingly, the disclosure is not limited to the terms used herein, and other terms indicating objects having equal technical meanings may be used.

As used in the following description, terms identifying an access node, terms indicating network entities, terms indicating messages, terms indicating an interface between network entities, and terms indicating various pieces of identification information are exemplified for convenience of description. Accordingly, the disclosure is not limited to terms to be described below, and other terms indicating objects having equal technical meanings may be used.

Hereinafter, the term 'BS' refers to an entity for allocating a resource to a UE and may be used interchangeably with at least one of a next-generation node B (gNode B), an evolved node B (eNode B), a node B, a BS, a wireless access unit, a BS controller, or a node over a network. Examples of a UE may include a UE, a mobile station (MS), a cellular phone, a smartphone, a computer, and a multimedia system capable of performing a communication function. However, these are merely examples, and the BS and the UE are not limited thereto. In the disclosure, an eNode B (eNB) may be interchangeably used with a gNode B (gNB) for convenience of description. That is, a BS described as an eNB may represent a gNB. In the disclosure, the term 'UE' may refer to various wireless communication devices as well as mobile phones, narrowband-Internet of things (NB-IoT) devices, and sensors.

In the following description, the terms 'physical channel' and 'signal' may be interchangeably used with data or a control signal. For example, the term 'physical downlink shared channel (PDSCH)' refers to a physical channel through which data is transmitted, but the PDSCH may also be used to refer to data. That is, in the disclosure, the expression 'transmitting a physical channel' may be equally interpreted as the expression 'transmitting data or a signal through a physical channel'.

Hereinafter, in the disclosure, higher signaling refers to a signal transmission method by which a BS transmits a signal to a UE by using a downlink (DL) data channel of a physical layer or a UE transmits a signal to a BS by using an uplink (UL) data channel of a physical layer. The higher signaling may be understood as radio resource control (RRC) signaling or a media access control (MAC) control element (CE).

In addition, in the disclosure, the expressions, such as 'greater than' or 'less than', are used to determine whether a particular condition is satisfied or fulfilled, but these expressions are only used to describe an example and do not exclude meaning of 'greater than or equal to' or 'less than or equal to'. A condition written with 'greater than or equal to' may be replaced with 'greater than', a condition with 'less than or equal to' may be replaced with 'less than', and a condition with 'greater than or equal to . . . and less than or equal to . . . ' may be replaced with 'greater than . . . and less than or equal to . . . '.

Also, in the disclosure, embodiments will now be described by using terms and names defined in some communication standards (e.g., the 3GPP), but the embodiments are only examples for description. The embodiments of the disclosure may be easily modified and applied to other communication systems.

FIG. 1 is a diagram of a wireless communication system according to an embodiment of the disclosure.

Referring to FIG. 1, illustrated is a wireless communication system including a BS 110, a UE 120, and a UE 130, as parts of nodes using wireless channels. While FIG. 1 illustrates only one BS, the wireless communication system may further include another BS that is the same as or similar to the BS 110.

The BS 110 refers to a network infrastructure that provides wireless access to the UEs 120 and 130. The BS 110 may have coverage defined as a certain geographical region based on a range for transmitting a signal. The BS 110 may also be referred to as an access point (AP), an eNB, a 5G node, a gNB, a wireless point, a transmission/reception point (TRP), or another term having an equivalent technical meaning.

Each of the UE 120 and the UE 130 may refer to an apparatus used by a user and may communicate with the BS 110 through a wireless channel. A link from the BS 110 to the UE 120 or the UE 130 may be referred to as a DL, and a link from the UE 120 or the UE 130 to the BS 110 may be referred to as a UL. Also, the UE 120 and the UE 130 may communicate with each other through a wireless channel. In this case, a link between the UE 120 and the UE 130 is referred to as an SL, and the SL may also be referred to as a PC5 interface. In some cases, at least one of the UE 120 and the UE 130 may operate without involvement of a user. That is, at least one of the UE 120 and the UE 130 is an apparatus performing machine type communication (MTC), and may not be carried by a user. Each of the UE 120 and the UE 130 may be referred to as, in addition to a terminal, a 'UE', an 'MS', a 'subscriber station', a 'remote terminal', a 'wireless terminal', a 'user device', or another term having an equivalent technical meaning.

The BS 110, the UE 120, and the UE 130 may transmit and receive a wireless signal in a millimeter-wave (mm-Wave) band (e.g., 28 GHz, 30 GHz, 38 GHz, or 60 GHz band). In this regard, in order to increase a channel gain, the BS 110, the UE 120, and the UE 130 may perform beamforming. In this case, the beamforming may include transmission beamforming and reception beamforming. That is, the BS 110, the UE 120, and the UE 130 may apply directivity to a transmission signal or a reception signal. For this, the BS 110 and the UEs 120 and 130 may select serving beams 112, 113, 121, and 131 through a beam search or beam management procedure. After the serving beams 112, 113, 121, and 131 are selected, communication thereafter may be performed by using a resource in a quasi-co-located (QCL) relationship with a resource on which the serving beams 112, 113, 121, and 131 are transmitted.

When large-scale characteristics of a channel through which a symbol on the first antenna port is transmitted are able to be inferred from a channel through which a symbol on the second antenna port is transmitted, a first antenna port and a second antenna port may be evaluated to be in a QCL relationship. For example, the large-scale characteristics may include at least one of a delay spread, a Doppler spread, a Doppler shift, an average gain, an average delay, and a spatial receiver parameter.

The UE 120 and the UE 130 shown in FIG. 1 may support vehicle communication. In the case of vehicle communication, in an LTE system, standardization for vehicle-to-everything (V2X) technology has been completed based on device-to-device (D2D) communication structure in 3GPP Release 14 and Release 15, and recently, efforts have been made to develop V2X technology based on 5G NR. NR V2X is to support unicast communication, groupcast (or multicast) communication, and broadcast communication between UEs. Also, unlike LTE V2X aimed for transmission/reception of basic safety information for driving of vehicles on roads, NR V2X is aimed to provide further advanced services, such as platooning, advanced driving, extended sensor, and remote driving.

V2X services may be divided into basic safety services and advanced services. The basic safety services may include detailed services, such as a cooperative awareness message (CAM) or a basic safety message (BSM) service, a left-turn notification service, a front vehicle collision warning service, an emergency vehicle approach notification service, a front obstacle warning service, and an intersection signal information service, and V2X information may be transmitted/received by using a broadcast, unicast, or groupcast transmission method. In the advanced services, quality of service (QoS) requirements may be strengthened than in the basic safety services, and in order to transmit/receive V2X information within a specific vehicle group or to transmit/receive V2X information between two vehicles, methods of transmitting/receiving V2X information by using unicast and groupcast transmission methods other than the broadcast transmission method are required. The advanced services may include detailed services, such as a platooning service, an autonomous driving service, a remote driving service, and an extended sensor-based V2X service.

Hereinafter, an SL refers to a transmission/reception path for a signal between UEs, and the SL may be interchangeably used with a PC5 interface. ABS is an entity that allocates a resource to a UE, and may support both V2X communication and general cellular communication or may support only V2X communication. That is, the BS may refer to an NR BS (e.g., a gNB), an LTE BS (e.g., an eNB), or a road site unit (RSU). A UE (or terminal) may include not only a general UE or an MS, but also a vehicle supporting vehicle-to-vehicle (V2V) communication, a vehicle or a pedestrian's handset (e.g., a smartphone) supporting a vehicle-to-pedestrian (V2P) communication, a vehicle supporting vehicle-to-network (V2N) communication, a vehicle supporting vehicle-to-infrastructure (V2I) communication, an RSU having embedded therein a UE function, an RSU having embedded therein a BS function, or an RSU having embedded therein a part of the BS function and a part of the UE function. In addition, a V2X UE used in the following description may be referred to as a UE. That is, in association with V2X communication, the UE may be used as the V2X UE.

The BS and the UE may be connected to each other through a Uu interface. A UL refers to a radio link through which the UE transmits data or a control signal to the BS, while a DL refers to a radio link through which the BS transmits data or a control signal to the UE.

Figure 2:
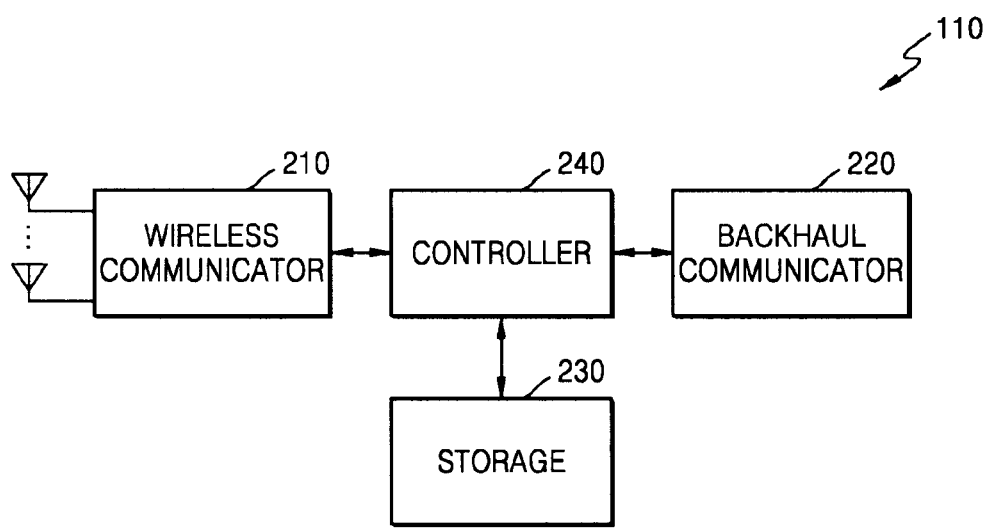
FIG. 2 illustrates a configuration of a base station in a wireless communication system, according to an embodiment of the disclosure.

FIG. 2 is a block diagram of a configuration of the BS in a wireless communication system, according to an embodiment of the disclosure. The configuration shown in FIG. 2 may be understood as a configuration of the BS 110. The term 'unit' or ' . . . er/or' used herein indicates a unit, which processes at least one function or operation, and may be implemented in hardware or software, or in a combination of hardware and software.

Referring to FIG. 2, the BS 110 may include a wireless communicator 210, a backhaul communicator 220, a storage 230, and a controller 240. However, the components of the BS are not limited to the aforementioned example. For example, the BS may include more components or fewer components than those described above. In addition, the wireless communicator 210, the backhaul communicator 220, the storage 230, and the controller 240 may be implemented in a single chip. Also, the controller 240 may include at least one processor.

In an embodiment, the wireless communicator 210 may perform functions for transmitting/receiving a signal through a wireless channel. For example, the wireless communicator 210 may perform conversion between a baseband signal and a bit string based on physical layer specifications of a system. For example, during data transmission, the wireless communicator 210 may generate complex symbols by encoding and modulating a transmission bit string. Also, during data reception, the wireless communicator 210 may reconstruct a reception bit string by demodulating and decoding a baseband signal.

Also, the wireless communicator 210 may up-convert a baseband signal into a radio frequency (RF) band signal and then may transmit the RF band signal via an antenna, and may down-convert an RF band signal received via the antenna, into a baseband signal. For this, the wireless communicator 210 may include a transmission filter, a reception filter, an amplifier, a mixer, an oscillator, a digital-to-analog converter (DAC), an analog-to-digital converter (ADC), or the like. Also, the wireless communicator 210 may include a plurality of transmission/reception paths. Furthermore, the wireless communicator 210 may include at least one antenna array including a plurality of antenna elements.

In terms of hardware, the wireless communicator 210 may be configured as a digital unit and an analog unit, and the analog unit may be configured as a plurality of sub-units depending on operation power, an operation frequency, or the like. The digital unit may be implemented as at least one processor (e.g., a digital signal processor (DSP)).

The wireless communicator 210 may transmit and receive signals as described above. Accordingly, all parts or some parts of the wireless communicator 210 may be referred to as a 'transmitter', a 'receiver', or a 'transceiver'. Also, in the following description, transmission and reception performed through a wireless channel may be used in the meaning that the aforementioned processing is performed by the wireless communicator 210.

The backhaul communicator 220 may provide an interface for communicating with other nodes in a network. That is, the backhaul communicator 220 may convert a bit string transmitted from the BS 110 to another node, e.g., another access node, another BS, a higher node, or a core network, into a physical signal, and may convert a physical signal received from another node, into a bit string.

The storage 230 may store data, such as basic programs, application programs, and configuration information, for operations of the BS 110. The storage 230 may be configured as a volatile memory, a non-volatile memory, or a combination of a volatile memory and a non-volatile memory. In addition, the storage 230 may provide the stored data upon a request from the controller 240.

The controller 240 may control overall operations of the BS 110. For example, the controller 240 may transmit and receive signals through the wireless communicator 210 or the backhaul communicator 220. Also, the controller 240 may write and read data to and from the storage 230. In addition, the controller 240 may perform functions of a protocol stack required by the communication standard. According to another embodiment, the protocol stack may be included in the wireless communicator 210. For this, the controller 240 may include at least one processor. According to embodiments, the controller 240 may control the BS 110 to perform operations according to embodiments to be described below.

Figure 3:
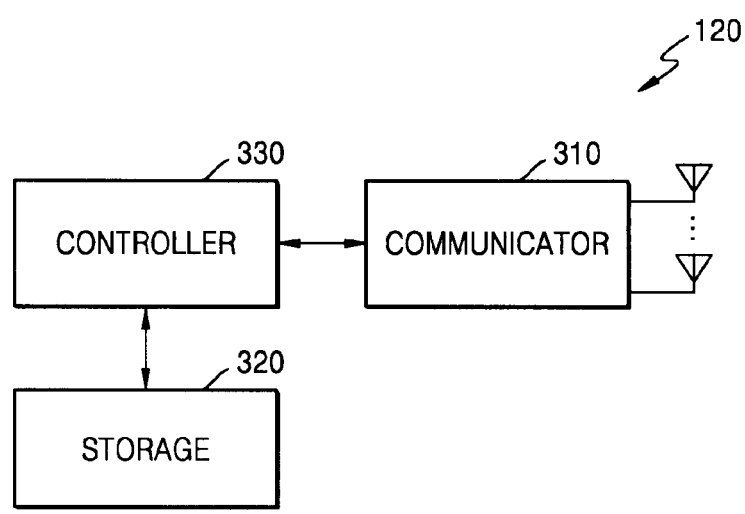
FIG. 3 illustrates a configuration of a terminal in a wireless communication system, according to an embodiment of the disclosure.

FIG. 3 is a block diagram of a configuration of the UE in a wireless communication system, according to an embodiment of the disclosure.

The configuration shown in FIG. 3 may be understood as a configuration of the UE 120. The term 'unit' or ' . . . er/or' used herein indicates a unit, which processes at least one function or operation, and may be implemented in hardware or software, or in a combination of hardware and software.

Referring to FIG. 3, the UE 120 may include a communicator 310, a storage 320, and a controller 330. However, the components of the UE 120 are not limited to the aforementioned example. For example, the UE 120 may include more components or fewer components than those described above. In addition, the communicator 310, the storage 320, and the controller 330 may be implemented in a single chip. Also, the controller 330 may include at least one processor.

In an embodiment, the communicator 310 may perform functions for transmitting/receiving a signal through a wireless channel. For example, the communicator 310 may perform conversion between a baseband signal and a bit string based on physical layer specifications of a system. For example, during data transmission, the communicator 310 may generate complex symbols by encoding and modulating a transmission bit string. Also, during data reception, the communicator 310 may reconstruct a reception bit string by demodulating and decoding a baseband signal. In addition, the communicator 310 may up-convert a baseband signal into an RF band signal and then may transmit the RF band signal through an antenna, and may down-convert an RF band signal received through the antenna, into a baseband signal. For example, the communicator 310 may include a transmission filter, a reception filter, an amplifier, a mixer, an oscillator, a DAC, an ADC, or the like.

Also, the communicator 310 may include a plurality of transmission/reception paths. Furthermore, the communicator 310 may include at least one antenna array including a plurality of antenna elements. In terms of hardware, the communicator 310 may be configured as a digital circuit and an analog circuit (e.g., a radio frequency integrated circuit (RFIC)). In this case, the digital circuit and the analog circuit may be implemented in one package. Also, the communicator 310 may include a plurality of RF chains. Furthermore, the communicator 310 may perform beamforming.

The communicator 310 may transmit and receive signals as described above. Accordingly, all parts or some parts of the communicator 310 may be referred to as a 'transmitter', a 'receiver', or a 'transceiver'. Also, in the following description, transmission and reception performed through a wireless channel may be used in the meaning that the aforementioned processing is performed by the communicator 310.

The storage 320 may store data, such as basic programs, application programs, or configuration information, for operations of the UE 120. The storage 320 may be configured as a volatile memory, a non-volatile memory, or a combination of a volatile memory and a non-volatile memory. In addition, the storage 320 may provide the stored data upon a request from the controller 330.

The controller 330 controls overall operations of the UE 120. For example, the controller 330 may transmit and receive signals through the communicator 310. Also, the controller 330 may write and read data to and from the storage 320. In addition, controller 330 may perform functions of a protocol stack required by the communication standard. For this, the controller 330 may include at least one processor or microprocessor or may be a part of a processor. Also, a part of the communicator 310 and the controller 330 may be referred to as a communication processor (CP). According to embodiments, the controller 330 may control the UE 120 to perform operations according to embodiments to be described below.

Figure 4:
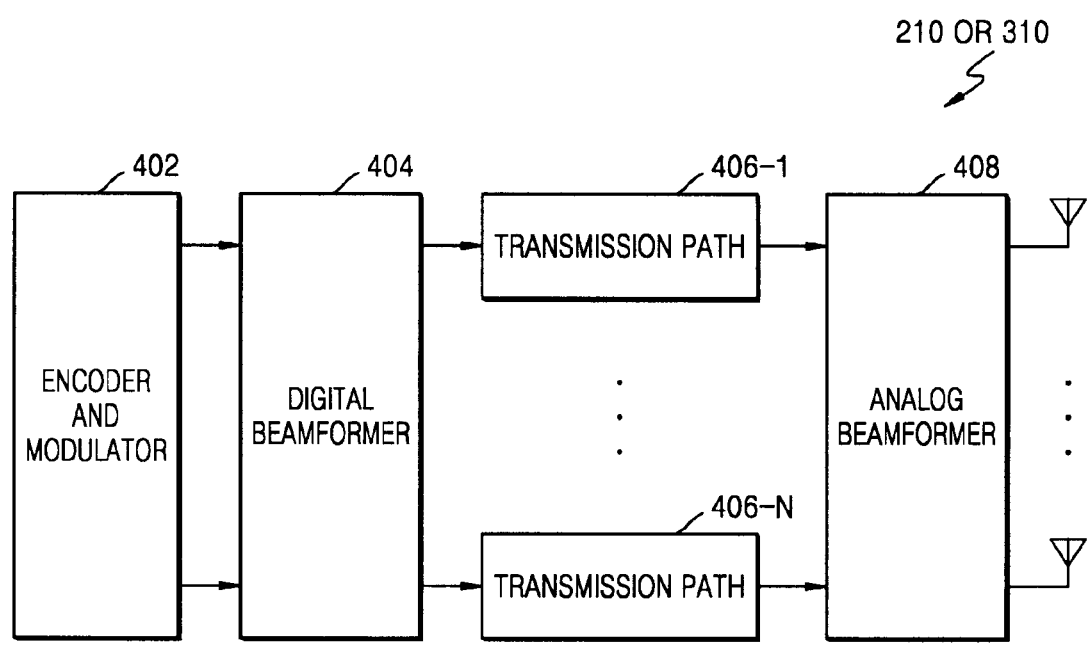
FIG. 4 illustrates a configuration of a communicator in a wireless communication system, according to an embodiment of the disclosure.

FIG. 4 illustrates a configuration of a communicator in a wireless communication system, according to an embodiment of the disclosure.

FIG. 4 illustrates an example of a detailed configuration of the wireless communicator 210 of FIG. 2 or the communicator 310 of FIG. 3. In detail, FIG. 4 illustrates components for performing beamforming, as parts of the wireless communicator 210 of FIG. 2 or the communicator 310 of FIG. 3.

Referring to FIG. 4, the wireless communicator 210 or the communicator 310 may include an encoder and modulator 402, a digital beamformer 404, a plurality of transmission paths 406-1 to 406-N, and an analog beamformer 408.

The encoder and modulator 402 may perform channel encoding. For the channel encoding, at least one of a low density parity check (LDPC) code, a convolution code, or a polar code may be used. The encoder and modulator 402 may generate modulated symbols by performing constellation mapping.

The digital beamformer 404 may perform beamforming on a digital signal (e.g., modulated symbols). For this, the digital beamformer 404 may multiply the modulated symbols by beamforming weights. In this case, the beamforming weights are used to change a magnitude and a phase of a signal, and may be referred to as a 'precoding matrix', a 'precoder', or the like. The digital beamformer 404 may output modulated symbols that are digitally-beamformed by the plurality of transmission paths 406-1 to 406-N. In this regard, according to a multiple-input multiple-output (MIMO) transmission technique, the modulated symbols may be multiplexed or the same modulated symbols may be provided to the plurality of transmission paths 406-1 to 406-N.

The plurality of transmission paths 406-1 to 406-N may convert the digitally-beamformed digital signals into analog signals. For this, each of the plurality of transmission paths 406-1 to 406-N may include an inverse fast Fourier transform (IFFT) operator, a cyclic prefix (CP) inserter, a DAC, and an up-converter. The CP inserter is provided for an orthogonal frequency division multiplexing (OFDM) method, and may be excluded when a different physical layer method (e.g., filter bank multi-carrier (FBMC)) is applied. That is, the plurality of transmission paths 406-1 to 406-N may provide independent signal processing processes to a plurality of streams generated through digital beamforming. However, depending on implementation methods, some components of the plurality of transmission paths 406-1 to 406-N may be commonly used.

The analog beamformer 408 may perform beamforming on an analog signal. For this, the digital beamformer 404 may multiply analog signals by beamforming weights. In this regard, the beamforming weights may be used to change a magnitude and a phase of a signal. In detail, the analog beamformer 408 may be variously configured, based on connection structures between the plurality of transmission paths 406-1 to 406-N and antennas. For example, each of the plurality of transmission paths 406-1 to 406-N may be connected to one antenna array. As another example, each of the plurality of transmission paths 406-1 to 406-N may be connected to one antenna array. Also, as another example, the plurality of transmission paths 406-1 to 406-N may be adaptively connected to one antenna array or at least two antenna arrays.

Figure 5:
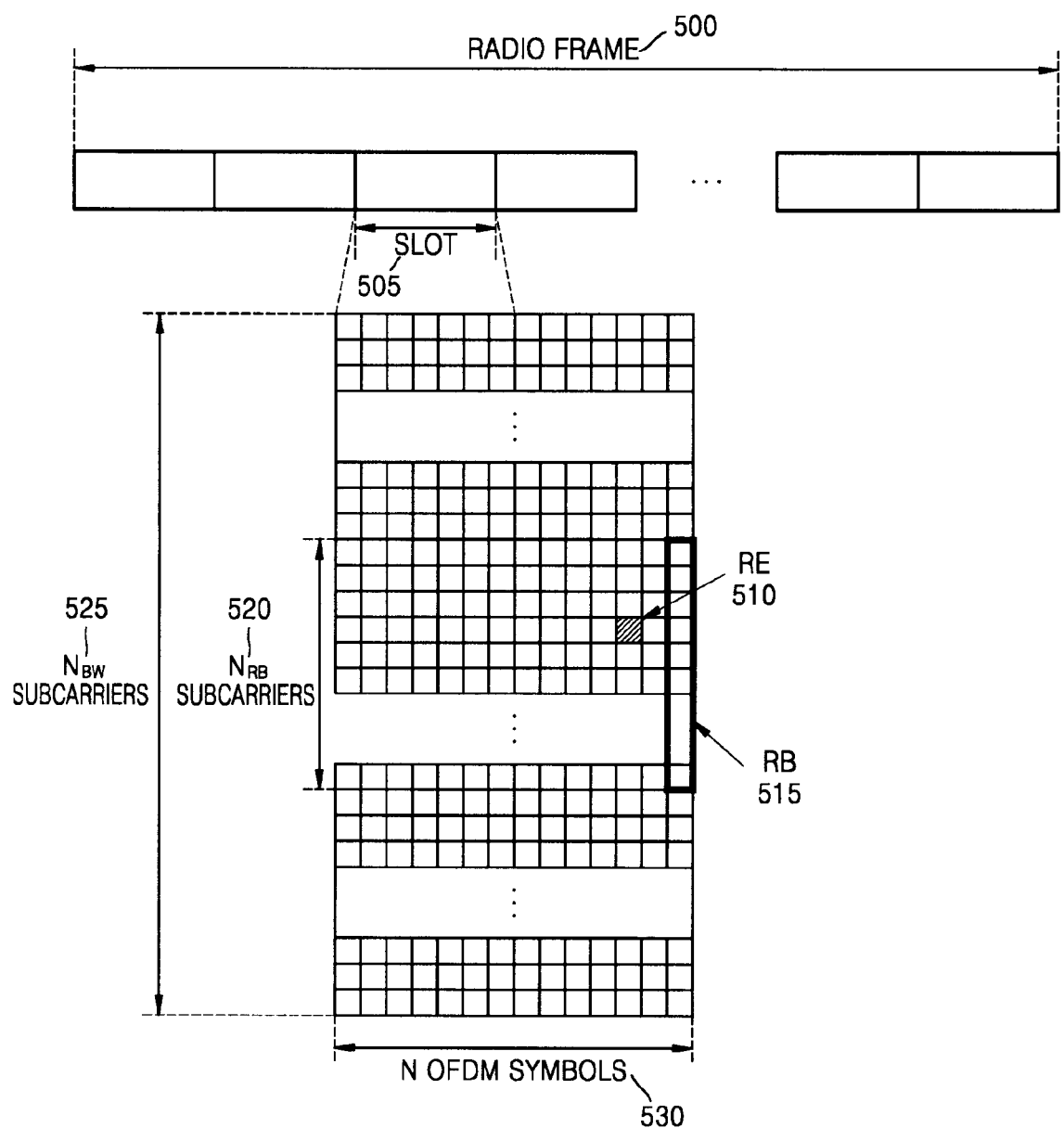
FIG. 5 illustrates a structure of a wireless time-frequency resource in a wireless communication system, according to an embodiment of the disclosure.

FIG. 5 illustrates a structure of a wireless time-frequency resource in a wireless communication system, according to an embodiment of the disclosure.

Referring to FIG. 5, in a radio resource domain, a horizontal axis represents a time domain, and a vertical axis represents a frequency domain. A minimum transmission unit in the time domain is an OFDM symbol or a discrete Fourier transform-spreading (DFT-S)-OFDM symbol, and one slot 505 may include Nsymb OFDM symbols or DFT-S-OFDM symbols 530. Unlike a slot, in an NR system, a length of a subframe may be defined as 1.0 ms, and a length of a radio frame 500 may be defined as 10 ms. A minimum transmission unit in the frequency domain is a subcarrier, and a bandwidth of an entire system transmission band may include a total of NBW subcarriers 525. Specific numerical values, such as Nsymb and NBW, may vary according to a system.

A basic unit in a time-frequency resource domain is a resource element (RE) 510, and the RE 510 may be represented by an OFDM symbol index or by a DFT-S-OFDM symbol index and a subcarrier index. A resource block (RB) 515 may be defined as NRB consecutive subcarriers 520 in the frequency domain. In general, a minimum transmission unit of data is an RB unit, and in the NR system, it is generally Nsymb=14 and NRB=12.

The structure of the wireless time-frequency resource as shown in FIG. 5 may be applied to a Uu interface. Also, the structure of the wireless time-frequency resource as shown in FIG. 5 may be similarly applied to an SL.

Figure 6A:
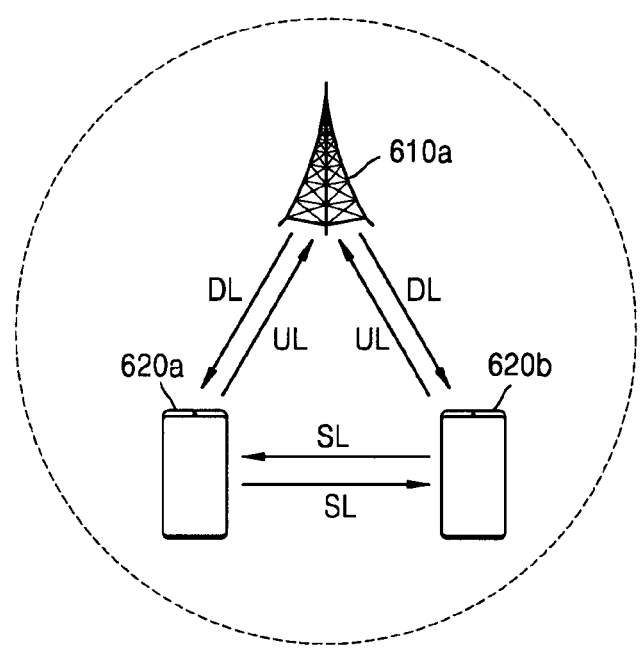
FIG. 6A is a diagram illustrating a scenario for sidelink communication, according to an embodiment of the disclosure.

FIG. 6A illustrates an example of a scenario for SL communication, according to an embodiment of the disclosure.

FIG. 6A illustrates an in-coverage scenario in which SL UEs 620a and 620b are located within coverage of a BS 610. The SL UEs 620a and 620b may receive data and control information from the BS 610 through a DL or may transmit data and control information to the BS 610 through a UL. In this case, the data and control information may data and control information for SL communication or may be data and control information for general cellular communication other than SL communication. Also, in FIG. 6A, the SL UEs 620a and 620b may transmit/receive data and information for SL communication through an SL.

Figure 6B:
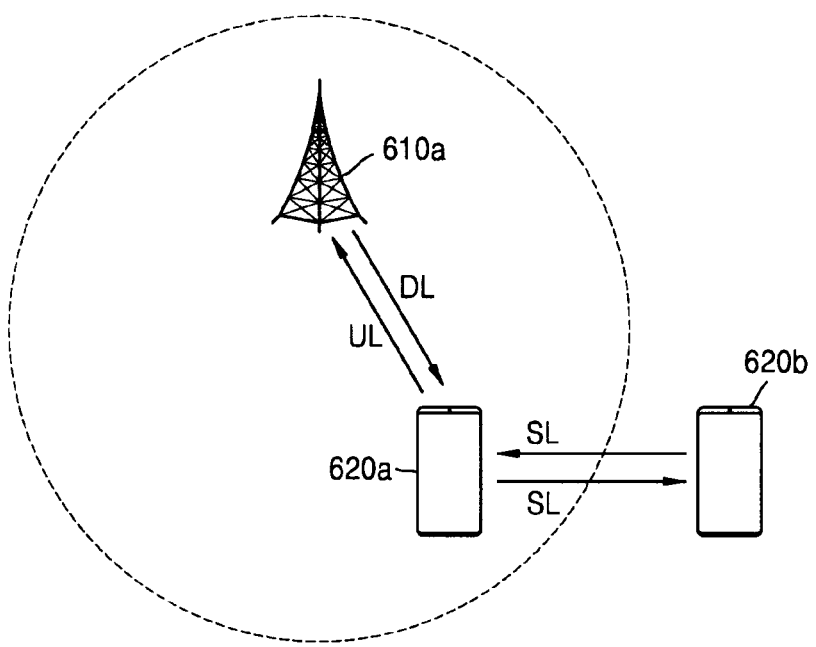
FIG. 6B is a diagram illustrating a scenario for sidelink communication, according to an embodiment of the disclosure.

FIG. 6B illustrates an example of a scenario for SL communication, according to an embodiment of the disclosure.

Referring to FIG. 6B, illustrated is partial coverage in which, among SL UEs, a first UE 620a is located within coverage of the BS 610 and a second UE 620b is located outside of the coverage of the BS 610. The first UE 620a located within the coverage of the BS 610 may receive data and control information from the BS 610 through a DL or may transmit data and control information to the BS 610 through a UL. The second UE 620b located outside of the coverage of the BS 610 may not receive data and control information from the BS 610 through a DL and may not transmit data and control information to the BS 610 through a UL. The second UE 620b may transmit/receive data and control information for SL communication to/from the first UE 620a through an SL.

Figure 6C:
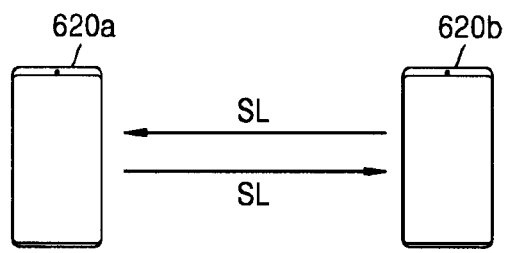
FIG. 6C is a diagram illustrating a scenario for sidelink communication, according to an embodiment of the disclosure.

FIG. 6C illustrates an example of a scenario for SL communication, according to an embodiment of the disclosure.

Referring to FIG. 6C, illustrated is a case where SL UEs (e.g., the first UE 620a and the second UE 620b) are located outside of coverage of the BS. Accordingly, the first UE 620a and the second UE 620b may not receive data and control information from the BS through a DL and may not transmit data and control information to the BS through a UL. The first UE 620a and the second UE 620b may transmit and receive data and control information for SL communication through an SL.

Figure 6D:
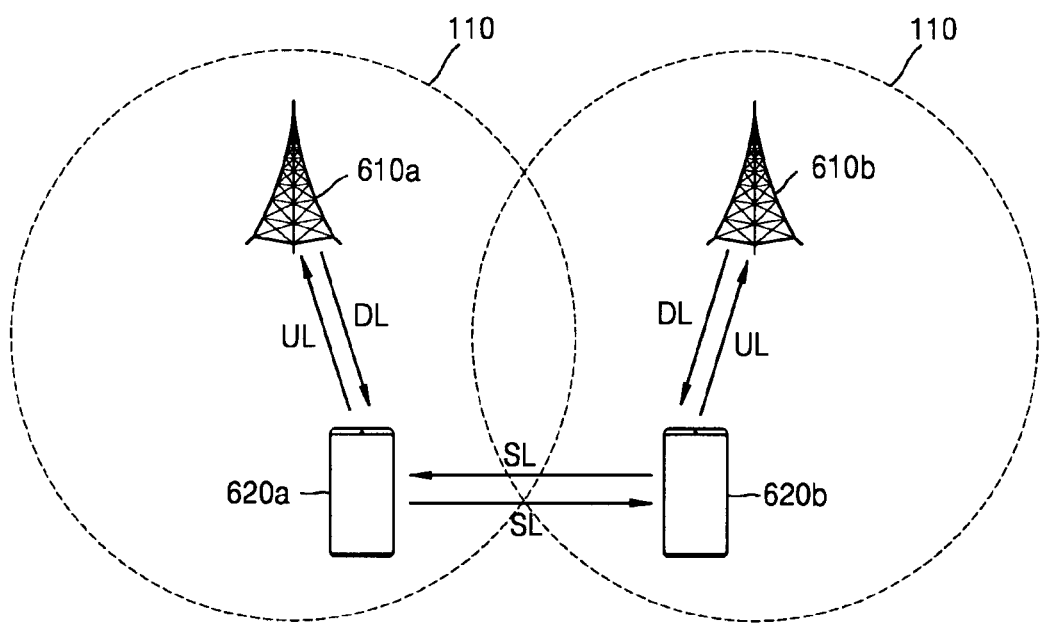
FIG. 6D is a diagram illustrating a scenario for sidelink communication, according to an embodiment of the disclosure.

FIG. 6D illustrates an example of a scenario for SL communication, according to an embodiment of the disclosure.

Referring to FIG. 6D, the first UE 620a and the second UE 620b performing SL communication may perform inter-cell SL communication in a connected state (e.g., an RRC connected state) with different BSs (e.g., a first BS 610a and a second BS 610b) or in a camping state (e.g., an RRC connection release state, i.e., an RRC idle state). In this case, the first UE 620a may be an SL transmission UE, and the second UE 620b may be an SL reception UE. Alternatively, the first UE 620a may be an SL reception UE, and the second UE 620b may be an SL transmission UE. The first UE 620a may receive an SL dedicated system information block (SIB) from a BS 610a to which the first UE 620a is connected (or on which the first UE 620a camps), and the second UE 620b may receive an SL dedicated SIB from another BS 610b to which the second UE 620b is connected (or on which the second UE 620b camps). In this case, information regarding the SL dedicated SIB received by the first UE 620a may be different from information regarding the SL dedicated SIB received by the second UE 620b. Accordingly, information needs to be unified to perform SL communication between UEs located in different cells.

In the aforementioned examples of FIGS. 6A to 6D, for convenience of description, an SL system composed of two UEs (e.g., a first UE 620a and a second UE 620b) has been described as an example, but the disclosure is not limited thereto, and may be applied to an SL system in which two or more UEs participate. Also, a UL and a DL between the BSs 610, 610a, and 610b and the SL UEs 620a and 620b may be referred to as a Uu interface, and an SL between SL UEs may be referred to as a PC5 interface. In the following description, a UL or a DL, a Uu interface, an SL, and PC5 may be interchangeably used.

In addition, in the disclosure, the UE may refer to a vehicle supporting V2V communication, a vehicle or the pedestrian's handset (e.g., a smartphone) supporting V2P communication, a vehicle supporting V2N communication, or a vehicle supporting V2I communication. Also, in the disclosure, the UE may refer to an RSU having embedded therein a UE function, an RSU having embedded therein a BS function, or an RSU having embedded therein a part of the BS function and a part of the UE function.

Figure 7A:
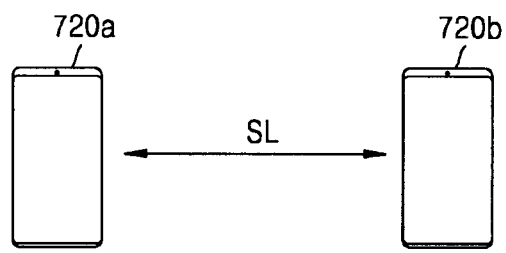
FIG. 7A is a diagram for describing a transmission method for sidelink communication, according to an embodiment of the disclosure.
Figure 7B:
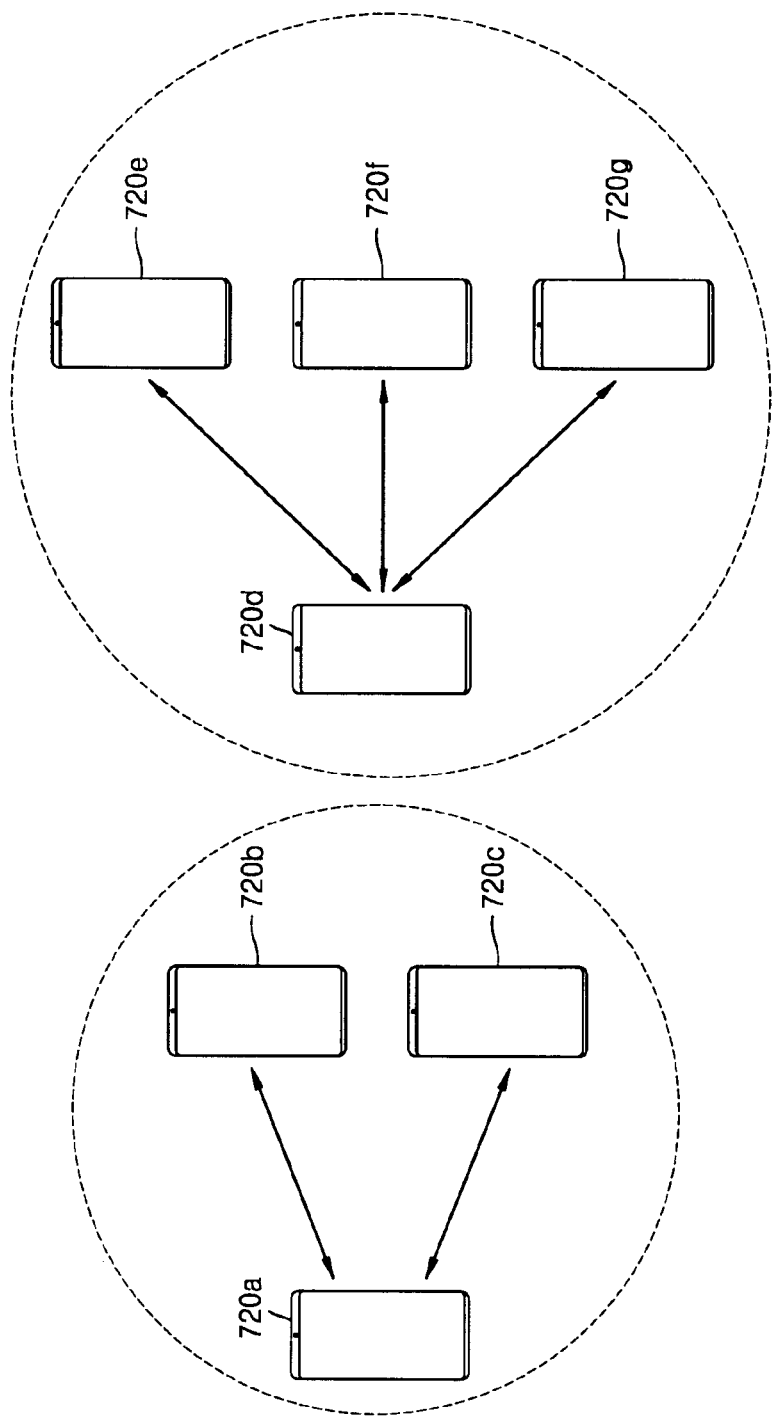
FIG. 7B is a diagram for describing transmission for sidelink communication, according to an embodiment of the disclosure.

FIGS. 7A and 7B are diagrams for describing a transmission method for SL communication, according to an embodiment of the disclosure.

In detail, FIG. 7A illustrates a unicast method, and FIG. 7B illustrates a groupcast method.

Referring to FIG. 7A, a transmission UE 720a and a reception UE 720b may perform one-to-one communication. The transmission method as shown in FIG. 7A may be referred to as unicast communication. Referring to FIG. 7B, a transmission UE 720a or 720d and reception UEs 720b, 720c, 720e, 720f, and 720g may perform one-to-many communication. The transmission method as shown in FIG. 7B may be referred to as groupcast or multicast communication. In FIG. 7B, a first UE 720a, a second UE 720b, and a third UE 720c may form one group and perform groupcast communication, and a fourth UE 720d, a fifth UE 720e, a sixth UE 720f, and a seventh UE 720g may form another group and perform groupcast communication. The UEs may perform groupcast communication within a group to which the UEs belong, and may perform unicast, groupcast, or broadcast communication with one or more other UEs belonging to different groups. For convenience of description, two groups are illustrated in FIG. 7B, but the disclosure is not limited thereto and may be applied to a case where a larger number of groups are formed.

In addition, although not shown in FIG. 7A or 7B, SL UEs may perform broadcast communication. The broadcast communication refers to a method by which all SL UEs receive data and control information transmitted by an SL transmission UE through an SL. For example, in FIG. 7B, when the first UE 720a is a transmission UE, other UEs 720b, 720c, 720d, 720e, 720f, and 720g may receive data and control information transmitted by the first UE 720a.

The aforementioned SL unicast communication, groupcast communication, and broadcast communication are supported in an in-coverage scenario, a partial-coverage scenario, or an out-of-coverage scenario.

In the case of an NR SL, unlike an LTE SL, support for a transmission type in which a vehicle UE transmits data to only one specific UE through unicast and a transmission type in which the vehicle UE transmits data to a plurality of specific UEs through groupcast may be considered. For example, when considering a service scenario such as platooning, which connects two or more vehicles to one network and allows the vehicles to move together in a cluster, such unicast and groupcast techniques may be useful. In detail, unicast communication may be used for a leader UE of a group connected by platooning to control one specific UE, and groupcast communication may be used to simultaneously control a group consisting of a plurality of specific UEs.

The following method may be used for resource allocation in a V2X system.

(1) Mode 1 Resource Allocation

Scheduled resource allocation is a method by which the BS allocates resources used for SL transmission to RRC-connected UEs in a dedicated scheduling method. The scheduled resource allocation method may be effective for interference management and resource pool management (dynamic allocation and/or semi-persistent transmission) because the BS may manage SL resources. When there is data to be transmitted to other UE(s), a UE in an RRC connected mode may transmit, to the BS, information indicating the presence of the data to be transmitted to the other UE(s), by using an RRC message or an MAC CE. For example, an RRC message transmitted by the UE to the BS may include an SidelinkUEInformation or UEAssistanceInformation message, and the MAC CE may correspond to a buffer status report (BSR) MAC CE including at least one of an indicator indicating a BSR for V2X communication and information regarding the size of data buffered for SL communication, a scheduling request (SR), or the like.

(2) Mode 2 Resource Allocation

Second, UE autonomous resource selection is a method in which an SL transmission/reception resource pool for V2X is provided to a UE as system information or an RRC message (e.g., an RRCReconfiguration message or a PC5-RRC message), and the UE selects a resource pool and resources according to a defined rule. The UE autonomous resource selection may correspond to one or a plurality of methods among the following resource allocation methods.

- A UE autonomously selects an SL resource for transmission.
- A UE assists SL resource selection for other UEs.
- A UE is configured with NR configured grant for SL transmission.
- A UE schedules SL transmission of other UEs.
- UE resource selection methods may include zone mapping, sensing-based resource selection, and random selection.
- In addition, even if the UE exists in coverage of the BS, resource allocation or resource selection may not be performed in a scheduled resource allocation or UE autonomous resource selection mode. In this case, even if the UE exists in the coverage of the BS, the UE may perform V2X SL communication in a UE random selection method through an exceptionally configured SL transmission/reception resource pool (exceptional resource pool).
- Also, when UEs for V2X communication exist outside of the coverage of the BS, the UE may perform V2X SL communication through a preset SL transmission/reception resource pool.

The UE may transmit/receive data to/from another UE through at least one SL carrier. Data transmission/reception through an SL carrier may include at least one of a unicast method, a groupcast method, and a broadcast method. Data transmission/reception through at least one SL carrier may include multi-carrier transmission for transmitting/receiving different packets for respective carriers. The data transmission/reception through the at least one SL carrier may include packet duplicate transmission (packet duplication) for transmitting/receiving the same packet on at least one carrier. For example, the duplicate transmission may refer to an operation of transmitting the same packet data convergence protocol (PDCP) packet of an SL radio bearer through at least one SL carrier. The UE may determine whether a failure occurs in any carrier during an operation of transmitting/receiving SL data to/from another UE through at least one carrier. Next, operations of the UE and the BS for determining whether a failure occurs in an SL carrier during data transmission/reception and handling the failure are described with reference to various embodiments.

Figure 8A:
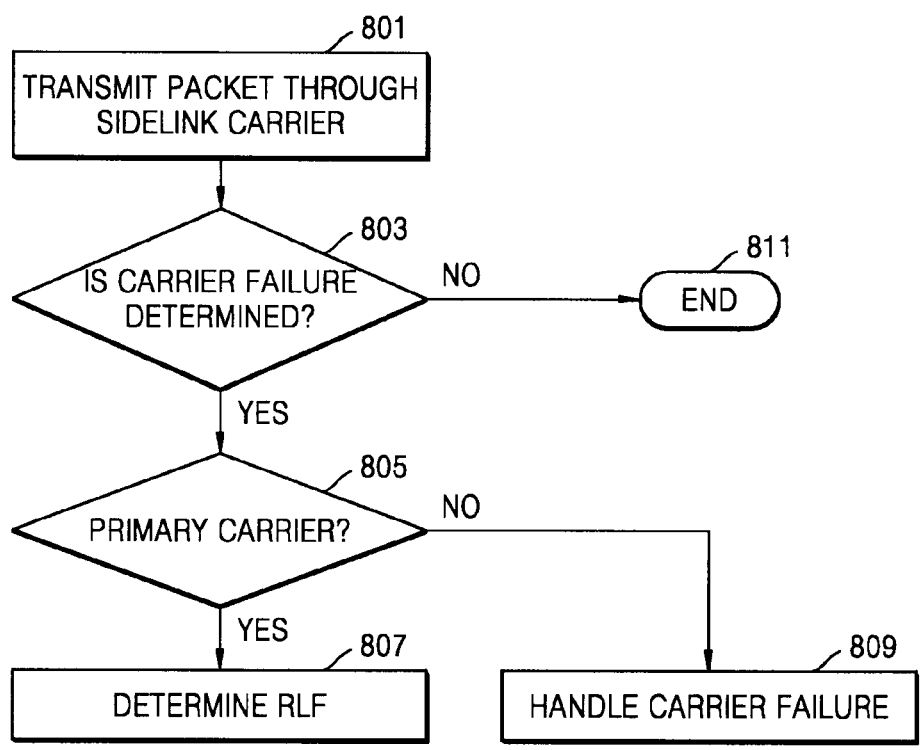
FIGS. 8A and 8B are diagrams for describing operations of a terminal for handling a failure of a sidelink carrier, according to an embodiment of the disclosure.
Figure 8B:
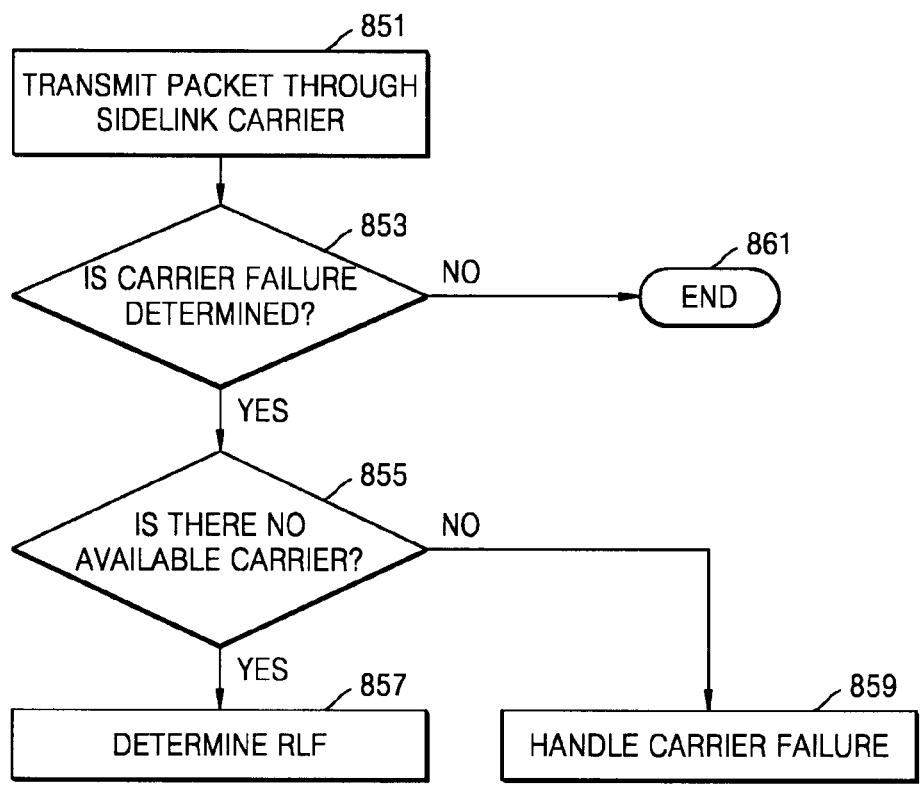

FIGS. 8A and 8B are diagrams for describing operations of the UE for handling a failure of an SL carrier, according to an embodiment of the disclosure.

According to an embodiment of the disclosure, a method by which the UE manages an SL carrier in a wireless communication system may include determining, by the UE, a failure of a secondary carrier and transmitting the failure of the secondary carrier to the BS, determining, by the UE, a failure of the secondary carrier and performing an operation of selecting/reselecting the secondary carrier, and determining, by the UE, a failure of the secondary carrier and transmitting the failure of the secondary carrier to a counterpart UE.

The embodiment of FIG. 8A may be applied to a case where a carrier used for multi-carrier transmission or duplicate transmission is divided into a primary carrier or a non-primary carrier. The embodiment of FIG. 8B may be applied to a case where there is no separate division between carriers used for multi-carrier transmission or duplicate transmission.

Referring to FIG. 8A, in operation 801, the UE may perform an operation of transmitting a packet through at least one SL carrier. In operation 803, the UE may determine a failure of the SL carrier. A method by which the UE determines the failure of the SL carrier in operation 803 is described below. When the UE determines the failure of the SL carrier in operation 803, the UE may determine in operation 805 whether a carrier in which the failure has occurred is a primary carrier. When the UE determines in operation 805 that the carrier in which the failure has occurred is the primary carrier, the UE may determine in operation 807 that the failure is an SL radio link failure (RLF). When the UE determines in operation 805 that the carrier in which the failure has occurred is a non-primary carrier, the UE may perform a carrier failure handling procedure in operation 809. In an embodiment, the UE may determine to continue using the non-primary carrier in which the failure has occurred, until a new carrier is configured, by performing a carrier failure handling procedure on the non-primary carrier in which the failure has occurred. In another embodiment, the UE may determine to suspend use of the non-primary carrier in which the failure has occurred, while performing a carrier failure handling procedure on the non-primary carrier in which the failure has occurred. Detailed operations of suspending and continuing the use of the non-primary carrier in which the failure has occurred will be described with reference to embodiments of FIGS. 9 to 12. When the UE determines in operation 803 that the failure has not occurred in the SL carrier, the UE may proceed to operation 811. In an embodiment, when the UE determines in operation 807 that the failure is an SL RLF, an access stratum (AS) layer of the UE may transmit an RLF indication (e.g., a PC5 RRC failure indication) to an upper layer (e.g., a V2X layer). When it is determined that the failure is an RLF, the AS layer of the UE may transmit the RLF indication to a network (NW). This corresponds to a case where the UE is connected to the NW.

The RLF indication transmitted by the UE to the NW may include the following embodiment.

```
SidelinkUEInformationNR-IEs ::=           SEQUENCE {
    sl-FailureList                        SL-FailureList,
}
SL-FailureList ::= SEQUENCE (SIZE (1..maxNrofSL-Destination)) of SL-Failure
SL-Failure ::= SEQUENCE {
    sl-DestinationIdentity                SL-DestinationIdentity,
    sl-Failure                            ENUMERATED
    {rlf,configFailure, spare6, spare5, spare4, spare3, spare2, spare1}
}
```

Referring to FIG. 8B, in operation 851, the UE may perform an operation of transmitting a packet through at least one SL carrier. In operation 853, the UE may determine a failure of the SL carrier. A method by which the UE determines the failure of the SL carrier in operation 853 is described below. When the UE determines in operation 853 that the failure has occurred in the SL carrier, the UE may determine in operation 855 whether an available carrier exists among SL carriers being used for packet transmission. When the UE determines in operation 855 that no available carrier exists, the UE may determine in operation 857 that the failure is an SL RLF. When the UE determines in operation 855 that the available carrier exists, the UE may perform a carrier failure handling procedure in operation 859. When it is not determined in operation 853 that a failure has occurred in the SL carrier, the UE may proceed to operation 861. In an embodiment, the UE may determine to continue using the carrier in which the failure has occurred, until a new carrier is configured, by performing a carrier failure handling procedure on the carrier in which the failure has occurred. In another embodiment, the UE may determine to suspend use of the carrier in which the failure has occurred, while performing a carrier failure handling procedure on the carrier in which the failure has occurred. Detailed operations of suspending and continuing the use of the carrier in which the failure has occurred will be described with reference to embodiments of FIGS. 9 to 12.

A criterion for determining whether a failure has occurred in the SL carrier in operation 803 of FIG. 8A and operation 853 of FIG. 8B may include at least one or a combination of the following cases.

(1) When it is determined that radio link control (RLC) packet retransmission for a packet transmitted through an SL carrier has reached the maximum value, the UE may determine that the SL carrier is in a failure state.

(2) When it is determined that hybrid automatic repeat request (HARQ) negative acknowledgement (NACK) (i.e., HARQ discontinuous transmission (HARQ DTX)) for a packet transmitted through an SL carrier has reached the maximum value, the UE may determine that the SL carrier is in a failure state. In an embodiment, the UE may determine whether the HARQ NACK (i.e., HARQ DTX) has reached the maximum value for a certain time. In another embodiment, the UE may determine whether HARQ NACK (i.e., HARQ DTX) has reached the maximum value regardless of time.

(3) When it is determined that continuous out of synchronization (synch) (hereinafter, referred to as OOS) for an SL carrier has reached the maximum value, the UE may determine that the SL carrier is in a failure state. In an embodiment, the UE may determine whether the continuous OOS has reached the maximum value for a certain time. In another embodiment, the UE may determine whether the continuous OOS has reached the maximum value regardless of time.

(4) When it is determined that an SL measurement value of an SL carrier is lower than a set threshold value, the UE may determine that the SL carrier is in a failure state. For example, for measurement of the SL carrier, a DMRS reference signal may be measured, and a measurement value and a threshold value for the SL carrier may be defined as, e.g., SL-RSRP values. When it is determined that a measurement value SL-RSRP of the DMRS reference signal for the SL carrier is lower than a set threshold value SL-RSRP, the UE may determine that the SL carrier is in a failure state.

(5) When it is determined that a channel busy ratio measurement value of an SL carrier is higher than a set threshold value, i.e., when it is determined that the SL carrier is busy, the UE may determine that the SL carrier is in a failure state. For example, a channel busy ratio of an SL carrier may be determined as a ratio of transmission resources determined to be in use to all transmission resources of the SL carrier. When the SL carrier is configured with at least one transmission resource pool, the UE may measure a channel busy ratio for currently set and used transmission resource pools and determine whether there is a failure in the SL carrier.

An example of an operation by which the UE determines a failure of a carrier based on RLC packet retransmission according to the embodiment of FIG. 8A is shown in [Table 1].

TABLE 1

Upon indication from SL RLC that maximum number of retransmissions has been reached
    • If duplication is configured and activated, and for the corresponding logical channel associated to non-primary RLC entity
        • Initiate the failure handling procedure
    • Else
        • Consider radio link failure to be detected (RLF)

An example of an operation by which the UE determines a failure of a carrier based on RLC packet retransmission according to the embodiment of FIG. 8B is shown in [Table 2].

TABLE 2

Upon indication from SL RLC that max. number of retrx has been reached
    • If duplication is configured and activated, and for the corresponding logical channel at least one available carrier is identified.
        • Initiate the failure handling procedure
    • Else
        • Consider radio link failure to be detected (RLF)

When the UE determines that an SL RLF has occurred in operation 807 of FIG. 8A and operation 857 of FIG. 8B, in an embodiment, the AS layer of the UE may transmit an SL RLF occurrence notification (e.g., a PC5 RRC failure indication) to an upper layer (e.g., a V2X layer) of the UE. In an embodiment, when the UE is connected to the BS (i.e., when the UE is in an RRC_CONNECTED state), the UE may transmit an SL RLF occurrence notification to the BS. When the UE transmits the SL RLF occurrence notification to the BS, the UE may additionally report at least one or a combination of information regarding at least one carrier that is in use and in which a failure is determined, a channel congestion level measurement result for a transmission resource pool of at least one carrier that is in use and in which a failure is determined, and a packet reception ratio of at least one carrier that is in use and in which a failure is determined.

In other words, considering both the embodiments of FIGS. 8A and 8B, the UE may transmit a packet to another UE through an SL carrier, determine a failure of the SL carrier, based on the transmitted packet, and determine whether to perform an RLF handling procedure or a carrier failure handling procedure based on a result of the determination and the SL carrier.

Also, the UE may determine whether the SL carrier is a primary carrier, and may determine whether to perform an RLF handling procedure or a carrier failure handling procedure based on a result of the determination.

In addition, the UE may determine whether an available carrier other than the SL carrier exists, and may determine whether to perform an RLF handling procedure or a carrier failure handling procedure based on a result of the determination.

Figure 9A:
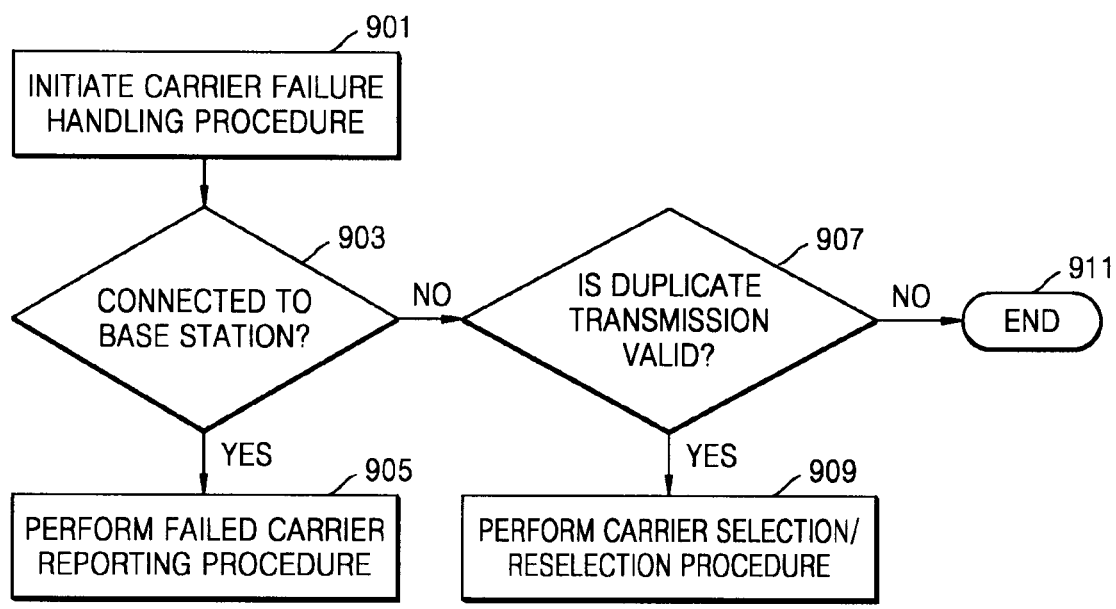
FIGS. 9A, 9B, and 9C are diagrams for describing operations of a terminal for handling a failure of a sidelink carrier, according to an embodiment of the disclosure.
Figure 9B:
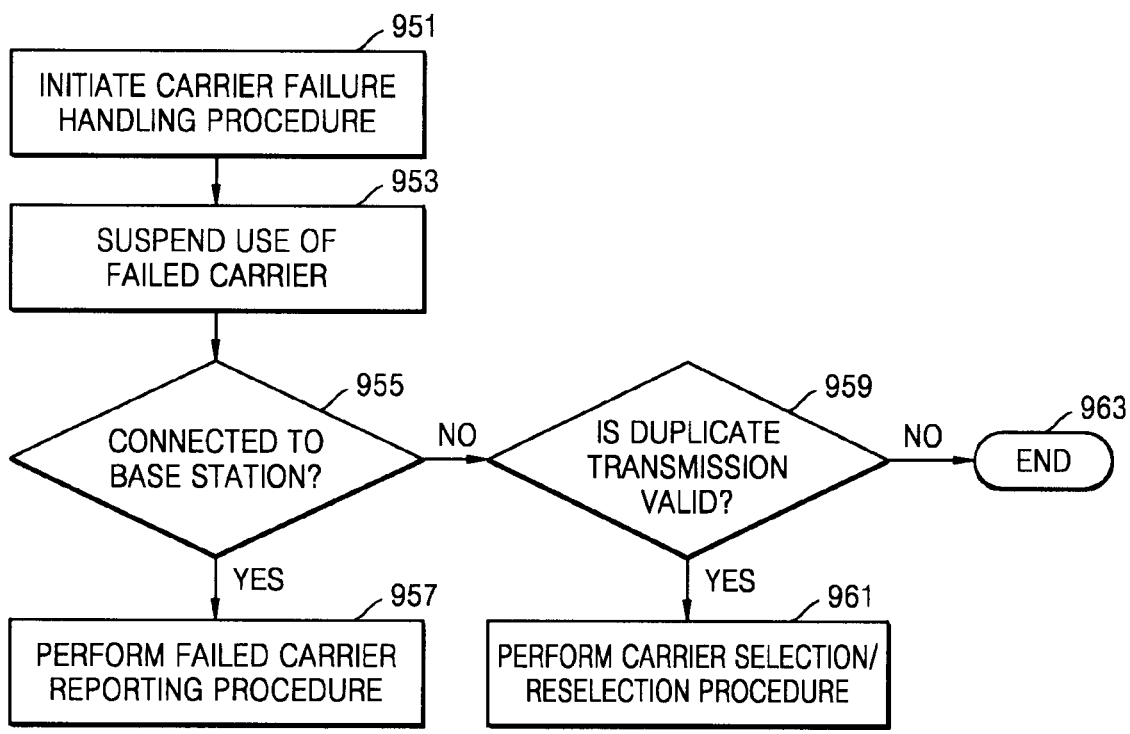
Figure 9C:
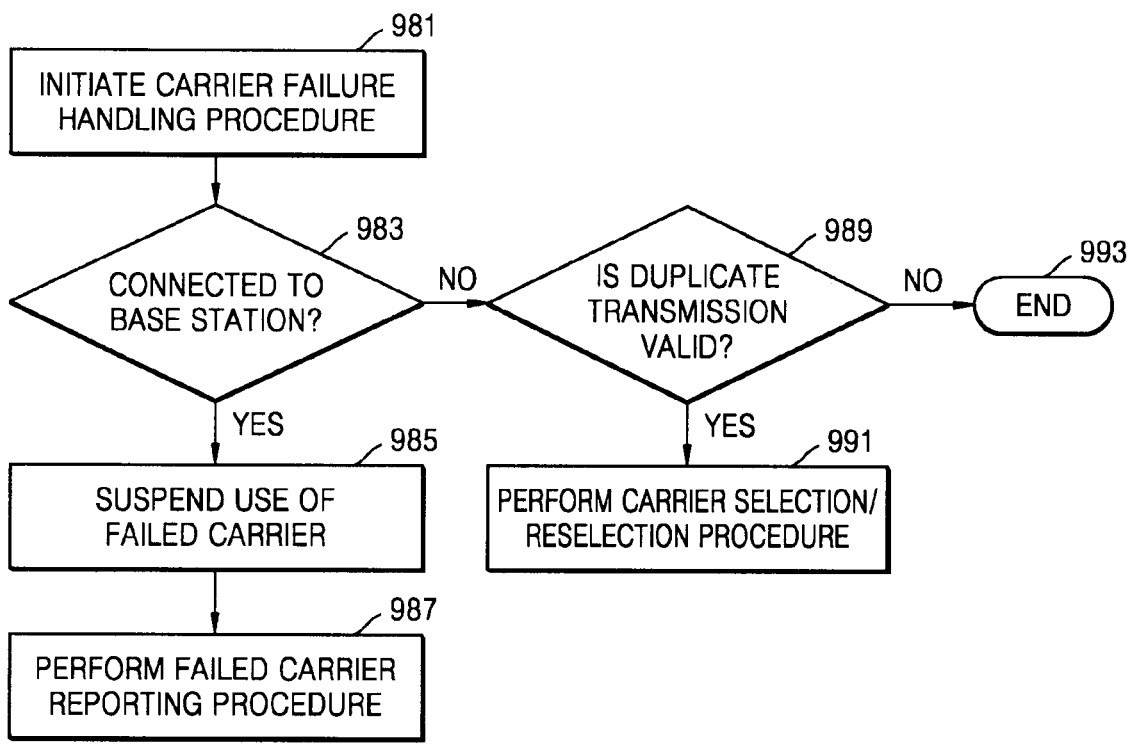

FIGS. 9A, 9B, and 9C are diagrams for describing operations of the UE for handling a failure of an SL carrier, according to an embodiment of the disclosure.

According to an embodiment of the disclosure, carrier failure handling procedures of FIGS. 9A, 9B, and 9C may correspond to the carrier failure handling procedures 809 and 859 of FIGS. 8A and 8B.

Referring to FIG. 9A, illustrated is an operating method of the UE for performing a carrier failure handling procedure without suspending use of a carrier determined to have failed. When the UE receives configuration information regarding a new carrier or duplicate transmission is deactivated, by performing the procedure of FIG. 9A, the UE may suspend use of a carrier (failed carrier) determined to have failed. Alternatively, when the UE receives configuration information regarding a new carrier and duplicate transmission is deactivated, by performing the procedure of FIG. 9A, the UE may suspend use of a carrier (failed carrier) determined to have failed. For example, when duplicate transmission is deactivated, the UE may determine that there is no need to use multi-carrier transmission.

In an embodiment, the UE may initiate a carrier failure handling procedure in operation 901. In operation 903, the UE may determine whether the UE is connected to the BS (RRC_CONNECTED). When the UE determines in operation 903 that the UE is connected to the BS, the UE may perform a carrier failure reporting procedure in operation 905. The BS may receive a carrier failure report message from the UE, determine a need for a new carrier for the UE, and when needed, configure new carrier information for the UE. When the UE determines in operation 903 that the UE is not connected to the BS (one of RRC_IDLE, RRC_INACTIVE, or OUT-OF-COVERAGE), the UE may determine in operation 907 whether a multi-carrier usage condition is valid or whether a duplicate transmission performance condition is valid. For example, when the duplicate transmission performance condition is valid, there may be a need to use a multi-carrier. When it is determined in operation 907 that the multi-carrier usage condition is valid or the duplicate transmission performance condition is valid, the UE may perform a carrier selection/reselection procedure in operation 909. That is, when it is necessary to perform duplicate transmission, the UE may determine that a procedure for selecting a carrier through which a packet is to be duplicately transmitted is necessary. When it is determined that the multi-carrier usage condition is valid or the duplicate transmission performance condition is valid, the UE in an RRC_IDLE/RRC_INACTIVE state or the UE in an OUT-OF-COVERATE state may perform an operation of selecting/reselecting a carrier based on configuration of a system information message or configuration of a pre-configuration. When it is determined that it is no longer necessary to perform multi-carrier transmission or perform duplicate transmission, the UE may determine that a procedure for selecting a carrier through which a packet is to be duplicately transmitted is unnecessary. For example, when it is no longer necessary to perform duplicate transmission, there may be no need to use a multi-carrier. When it is determined in operation 907 that the multi-carrier usage condition is not valid or the duplicate transmission performance condition is not valid, the UE may proceed to operation 911 to end the carrier failure handling procedure.

FIG. 9B illustrates an operation of the UE for suspending use of a carrier determined to have failed, and performing a carrier failure handling procedure. Referring to FIG. 9B, the UE may initiate a carrier failure handling procedure in operation 951. In operation 953, the UE may suspend use of a carrier (failed carrier) determined to have failed. In operation 955, the UE may determine whether the UE is connected to the BS (RRC_CONNECTED). When it is determined in operation 955 that the UE is connected to the BS, the UE may perform a carrier failure reporting procedure in operation 957. That is, the UE may perform a reporting procedure for the carrier determined to have failed. The BS may receive a carrier failure report message from the UE, determine a need for a new carrier for the UE, and when needed, configure new carrier information for the UE. When the UE determines in operation 955 that the UE is not connected to the BS (one of RRC_IDLE, RRC_INACTIVE, or OUT-OF-COVERAGE), the UE may determine in operation 959 whether a multi-carrier usage condition is valid or whether a duplicate transmission performance condition is valid. When it is determined that the multi-carrier usage condition is valid or the duplicate transmission performance condition is valid, the UE in an RRC_IDLE/RRC_INACTIVE state or the UE in an OUT-OF-COVERATE state may perform an operation of selecting/reselecting a carrier based on configuration of a system information message or configuration of a pre-configuration. When it is determined in operation 959 that the multi-carrier usage condition is valid or the duplicate transmission performance condition is valid, the UE may perform a carrier selection/reselection procedure in operation 961. That is, when it is necessary to perform duplicate transmission, the UE may determine that a procedure for selecting a carrier through which a packet is to be duplicately transmitted is necessary. When it is determined that it is no longer necessary to perform duplicate transmission, the UE may determine that a procedure for selecting a carrier through which a packet is to be duplicately transmitted is unnecessary. When it is determined in operation 959 that the multi-carrier usage condition is not valid or the duplicate transmission performance condition is not valid, the UE may proceed to operation 963 to end the carrier failure handling procedure.

FIG. 9C illustrates an operation of the UE for suspending use of a carrier (failed carrier) determined to have failed, while performing a reporting procedure for the carrier determined to have failed. Referring to FIG. 9C, the UE may initiate a carrier failure handling procedure in operation 981. In operation 983, the UE may determine whether the UE is connected to the BS (RRC_CONNECTED). In an embodiment, when it is determined in operation 983 that the UE is connected to the BS, in operation 985, the UE may suspend use of a carrier determined to have failed. The UE may perform a carrier failure reporting procedure in operation 987. In another embodiment, after performing the carrier failure reporting procedure in operation 987, the UE may suspend use of the carrier determined to have failed. The BS may receive a carrier failure report message from the UE, determine a need for a new carrier for the UE, and when needed, configure new carrier information for the UE.

When it is determined in operation 983 that the UE is not connected to the BS (one of RRC_IDLE, RRC_INACTIVE, or OUT-OF-COVERAGE), the UE may determine in operation 989 whether a multi-carrier transmission condition is valid or whether a duplicate transmission performance condition is valid. When it is determined that the multi-carrier transmission condition is valid or the duplicate transmission performance condition is valid, the UE in an RRC_IDLE/RRC_INACTIVE state or the UE in an OUT-OF-COVERATE state may perform an operation of selecting/reselecting a carrier based on configuration of a system information message or configuration of a pre-configuration. When it is determined in operation 989 that the multi-carrier transmission condition is valid or the duplicate transmission performance condition is valid, the UE may perform a carrier selection/reselection procedure in operation 991. That is, when it is necessary to perform duplicate transmission, the UE may determine that a procedure for selecting a carrier through which a packet is to be duplicately transmitted is necessary. When it is determined that it is no longer necessary to perform duplicate transmission, the UE may determine that a procedure for selecting a carrier through which a packet is to be duplicately transmitted is unnecessary. When it is determined in operation 989 that the multi-carrier transmission condition is not valid or the duplicate transmission performance condition is not valid, the UE may proceed to operation 993 to end the carrier failure handling procedure.

The operation of the reporting procedure for the carrier (failed carrier) determined to have failed, performed by the UE in operations 905, 957, and/or 987 may include an embodiment of an SLFailureInformation message in [Table 3]. The SLFailureInformation message may be replaced with a SidelinkUEInformationNR message.

TABLE 3

- If UE is initiated for failure handling and the UE is in RRC_CONNECTED, set SLFailureInfoRLC-Bearer as follows:
    - Set sl-DestinationIdentity to the sidelink destination identity of the failing bearer
    - Set slrbIdentity to the sidelink radio bearer identity of the failing RLC bearer
    - Set carrierFreqID to the sidelink carrier frequency identify of the failing RLC bearer
    - Set the failureType as rlc-failure (or duplication or carrierFailure)
- Submit the SLFailureInformation message to lower layers for transmission via SRB1

An embodiment of the SLFailureInformation message transmitted by the UE to the BS in operations 905, 957, and/or 987 may be shown in [Table 4].

TABLE 4 failureType
This field indicates the type of failure reported. Value duplication indicates that a radio link failure for one of the SL RLC entities configured with SL PDCP duplication has been detected. Value carrierFailure indicates that a failure for one of the SL RLC entities configured with multiple carriers has been detected.
logicalChannelIdentity, logicalChannelIdentityExt
This field indicates the logical channel identity of the SL RLC entity for which the SL PDCP duplication failure occurred or the logical channel identity of the SL RLC entities for which the carrier failure occurred.

The SLFailureInformation message in operations 905, 957, and/or 987 may include at least one or a combination of pieces of information in [Table 5].

TABLE 5

- SL logical channel group identity
    - In SLFailureInformation message, UE can report sidelink LCGID of the failing SL RLC bearer to NW.
    - SL LCGID associated to SLRB can be assigned by NW to UE.
- SL logical channel identity
    - In SLFailureInformation message, UE can report sidelink logical channel identity of the failing SL RLC bearer to NW.
    - LCID is assigned by UE. Once a logical channel ID is assigned for a SLRB, UE can report the assigned logical channel ID to NW.

In operations 905, 957, and/or 987, the UE may report at least one or a combination of a channel congestion level measurement result for a transmission resource pool of at least one carrier that is in use and in which a failure is determined, a packet reception ratio of at least one carrier that is in use and in which a failure is determined, and a channel measurement result value of at least one carrier that is in use and in which a failure is determined. The UE may report at least one or a combination of a channel congestion level measurement result for a transmission resource pool of at least one carrier in use, a packet reception ratio of at least one carrier in use, and a channel measurement result value of at least one carrier that is in use and in which a failure is determined.

```
- SLFailureInformation
The SLFailureInformation message is used to provide information regarding failures detected by the UE, e.g. radio link
failure for one of the SL RLC entities configured with SL PDCP duplication or e.g. radio link failure for one of SL RLC
entities configured with SL PDCP duplication.
Signalling radio bearer: SRB1
RLC-SAP: AM
-- ASN1START
SLFailureInformation ::=                SEQUENCE {
    criticalExtensions                  CHOICE {
        failureInformation                  FailureInformation-IEs,
        criticalExtensionsFuture                                                        SEQUENCE { }
}
FailureInformation-IEs ::=              SEQUENCE {
    sl-DestinationIdentity              SL-DestinationIdentity,
    slfailureInfoRLC-Bearer                 SLFailureInfoRLC-Bearer             OPTIONAL,
    lateNonCriticalExtension                OCTET STRING                        OPTIONAL,
    nonCriticalExtension                SEQUENCE { }                            OPTIONAL
}
SLFailureInfoRLC-Bearer                 SEQUENCE {
    slrbIdentity                            INTEGER (1..N),
    sl-LogicalChannelInfo                   SL-LogicalChannelInfo,
    carrierFreqID                           ARFCN-ValueNR,
    failureType                         ENUMERATED {rlc-failure, duplication, carrierFailure, spare3, spare2, spare1}
}
SL-LogicalChannelInfo ::= SEQUENCE {
    sl-logicalChannelIdentity           INTEGER (1..10)
    sl-logicalChannelIdentityExt            INTEGER (32..38)
}
-- ASN1STOP
```

In operations 905, 957, and/or 987, the UE may report, to the BS, information regarding at least one new carrier determined to be available. In other words, based on FIGS. 9A to 9C, the UE may determine whether to perform a reporting procedure for a carrier (failed carrier) determined to have failed, based on a connection state with the BS, and may determine whether to perform a carrier selection/reselection procedure based on whether multi-carrier transmission is valid or whether duplicate transmission is valid. Also, the UE may suspend use of the carrier (failed carrier) determined to have failed, delete a configuration for the carrier, and perform an operation of determining the connection state with the BS. Alternatively, the UE may not suspend use of the carrier (failed carrier) determined to have failed, or after performing an operation of determining the connection state with the BS, may suspend use of the carrier (failed carrier) determined to have failed, and delete a configuration for the carrier.

Figure 10A:
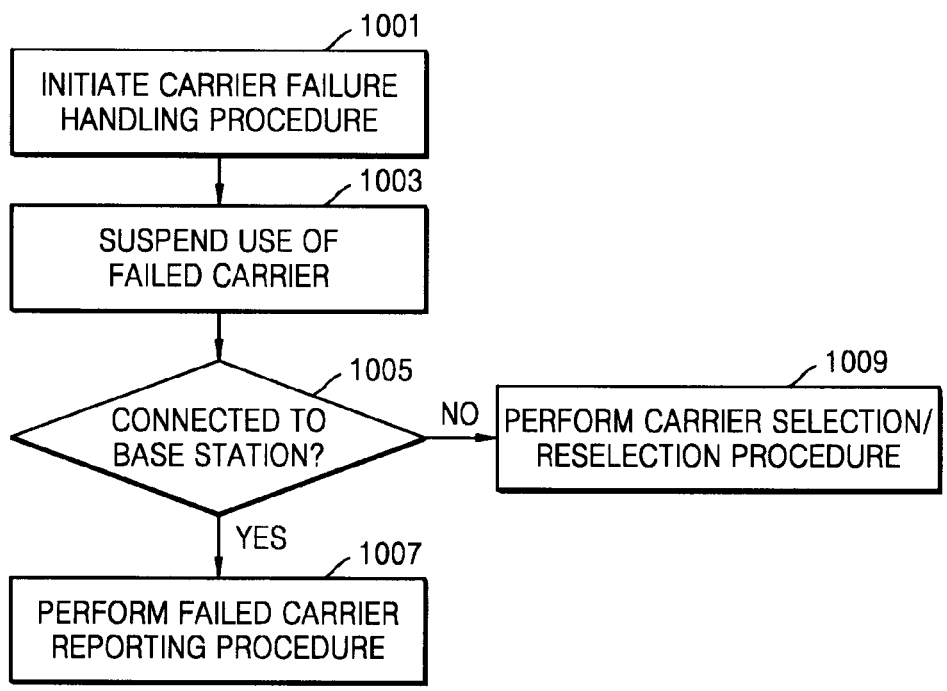
FIGS. 10A and 10B are diagrams for describing operations of a terminal for handling a failure of a sidelink carrier, according to an embodiment of the disclosure.
Figure 10B:
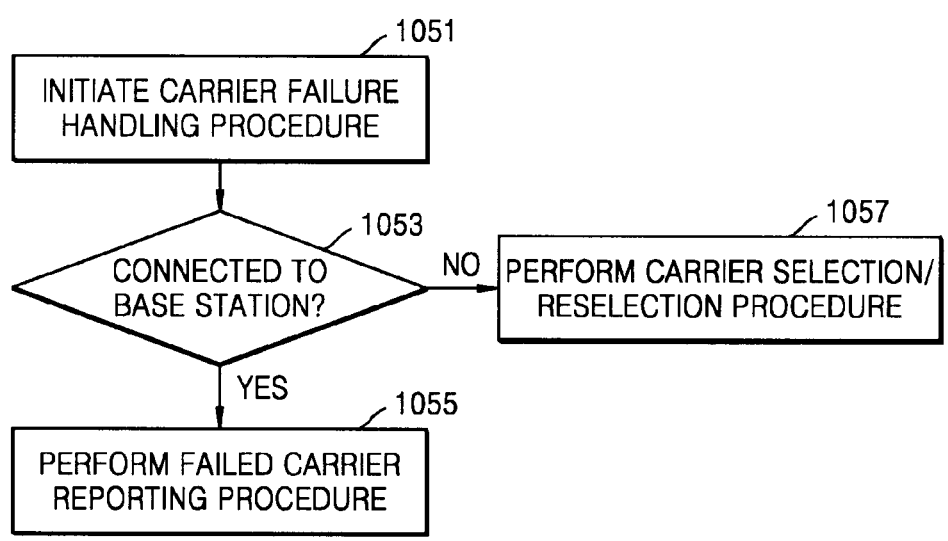

FIGS. 10A and 10B are diagrams for describing operations of the UE for handling a failure of an SL carrier, according to an embodiment of the disclosure.

According to an embodiment of the disclosure, carrier failure handling procedures of FIGS. 10A and 10B may correspond to the carrier failure handling procedures 809 and 859 of FIGS. 8A and 8B.

FIG. 10A illustrates an operation of the UE for suspending use of a carrier determined to have failed, and performing a carrier failure handling procedure. Referring to FIG. 10A, the UE may initiate a carrier failure handling procedure in operation 1001. In operation 1003, the UE may suspend use of a carrier (failed carrier) determined to have failed, and delete a configuration for the carrier. In operation 1005, the UE may determine whether the UE is connected to the BS (RRC_CONNECTED). When the UE determines in operation 1005 that the UE is connected to the BS, the UE may perform a carrier failure reporting procedure in operation 1007. The BS may receive a carrier failure report message from the UE, determine a need for a new carrier for the UE, and when needed, configure new carrier information for the UE. The carrier failure reporting procedure in operation 1007 may be the same as operation 905 described above with reference to FIG. 9A. When it is determined in operation 1005 that the UE is not connected to the BS (one of RRC_IDLE, RRC_INACTIVE, or OUT-OF-COVERAGE), the UE may perform a carrier selection/reselection procedure in operation 1009. When it is determined that a multi-carrier usage condition is valid or the duplicate transmission performance condition is valid, the UE in an RRC_IDLE/RRC_INACTIVE state or the UE in an OUT-OF-COVERATE state may perform an operation of selecting/reselecting a carrier based on configuration of a system information message or configuration of a pre-configuration.

FIG. 10B illustrates an operation of the UE for performing a carrier failure handling procedure without suspending use of a carrier determined to have failed. When the UE obtains configuration information regarding a new carrier by performing the procedure of FIG. 10B, the UE may suspend use of a carrier (failed carrier) determined to have failed. In an embodiment, the configuration information regarding the new carrier may be obtained while the UE itself performs a carrier selection/reselection procedure. In another embodiment, the configuration information regarding the new carrier may be obtained from the BS. That is, the BS may receive a carrier failure report message from the UE, determine a need for a new carrier for the UE, and when needed, configure new carrier information for the UE. When the UE determines that duplicate transmission is deactivated, by performing the procedure of FIG. 10B, the UE may suspend use of the carrier (failed carrier) determined to have failed, and delete a configuration for the carrier.

Referring to FIG. 10B, the UE may initiate a carrier failure handling procedure in operation 1051. In operation 1053, the UE may determine whether the UE is connected to the BS (RRC_CONNECTED). When the UE determines in operation 1053 that the UE is connected to the BS, the UE may perform a carrier failure reporting procedure in operation 1055. The carrier failure reporting procedure in operation 1055 may be the same as operation 905 described above with reference to FIG. 9A. The BS may receive a carrier failure report message from the UE, determine a need for a new carrier for the UE, and when needed, configure new carrier information for the UE. When it is determined in operation 1053 that the UE is not connected to the BS (one of RRC_IDLE, RRC_INACTIVE, or OUT-OF-COVERAGE), the UE may perform a carrier selection/reselection procedure in operation 1057. When it is determined that the multi-carrier usage condition is valid or the duplicate transmission performance condition is valid, the UE in an RRC_IDLE/RRC_INACTIVE state or the UE in an OUT-OF-COVERATE state may perform an operation of selecting/reselecting a carrier based on configuration of a system information message or configuration of a pre-configuration. In other words, based on FIG. 10A or 10B, the UE may determine whether to perform a reporting procedure for a carrier in which a failure has occurred (or, a new carrier may be configured by the BS), or may determine whether to perform a carrier selection/reselection procedure, based on a connection state with the BS. Also, the UE may suspend use of the carrier (failed carrier) in which a failure has occurred, delete a configuration for the carrier, and perform a procedure for determining the connection state with the BS. Alternatively, the UE may not suspend use of the failed carrier, or after performing a procedure for determining the connection state with the BS, may suspend use of the failed carrier and delete a configuration for the carrier.

Figure 11A:
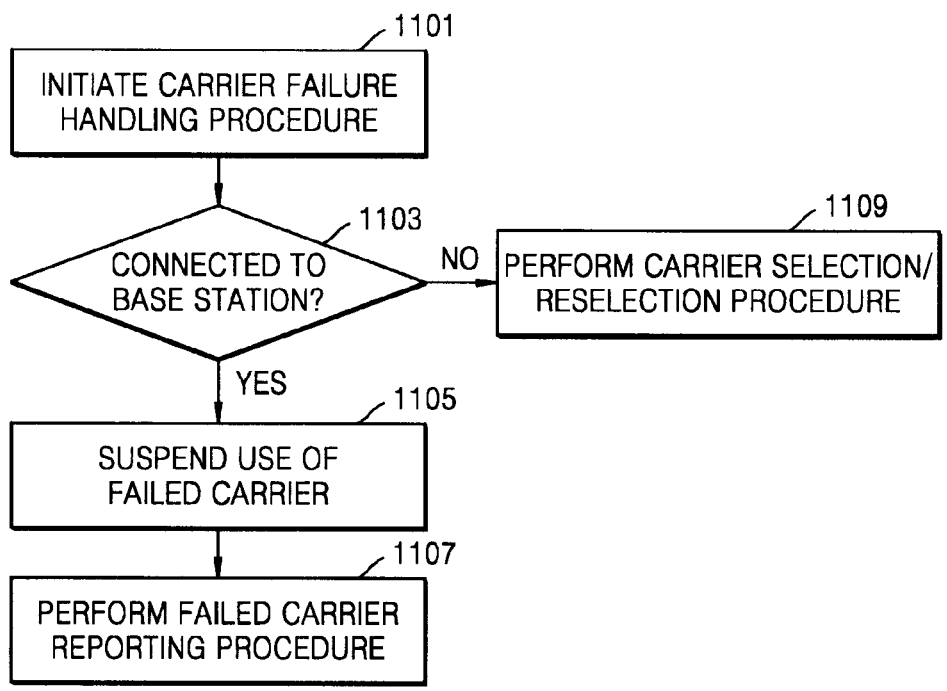
FIGS. 11A and 11B are diagrams for describing operations of a terminal for handling a failure of a sidelink carrier, according to an embodiment of the disclosure.
Figure 11B:
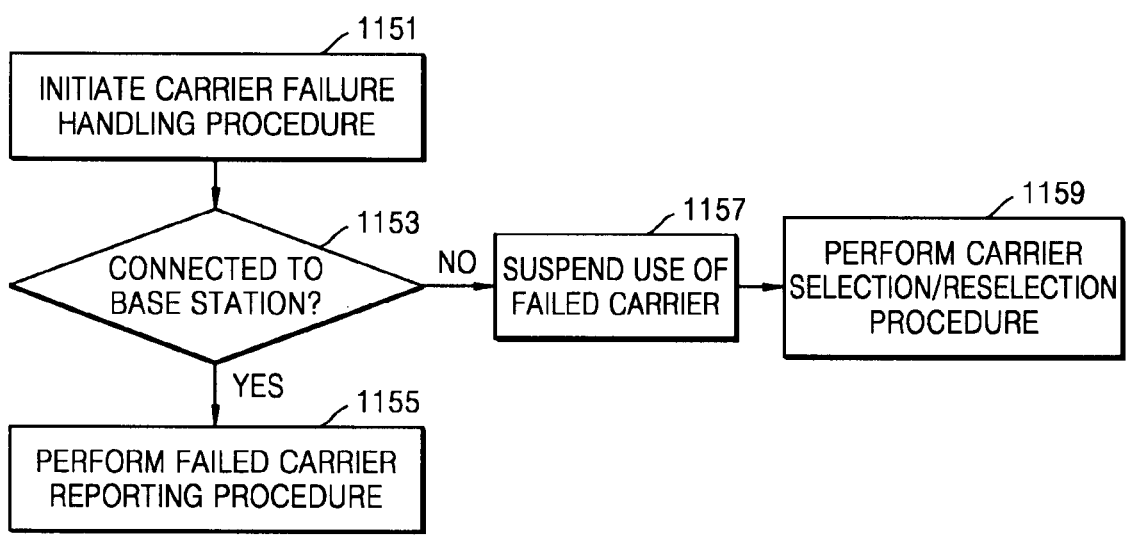

FIGS. 11A and 11B are diagrams for describing operations of the UE for handling a failure of an SL carrier, according to an embodiment of the disclosure.

According to an embodiment of the disclosure, carrier failure handling procedures of FIGS. 11A and 11B may correspond to the carrier failure handling procedures 809 and 859 of FIGS. 8A and 8B.

FIG. 11A illustrates an operation of the UE for suspending use of a carrier (failed carrier) determined to have failed, and deleting a configuration for the carrier, while performing a reporting procedure for the carrier determined to have failed. Referring to FIG. 11A, the UE may initiate a carrier failure handling procedure in operation 1101. In operation 1103, the UE may determine whether the UE is connected to the BS (RRC_CONNECTED). In an embodiment, when it is determined in operation 1103 that the UE is connected to the BS, in operation 1105, the UE may suspend use of a carrier determined to have failed, and delete a configuration for the carrier. The UE may perform a carrier failure reporting procedure in operation 1107. The carrier failure reporting procedure in operation 1107 may be the same as operation 905 described above with reference to FIG. 9A. In another embodiment, after performing the carrier failure reporting procedure in operation 1107, the UE may suspend use of the carrier determined to have failed, and delete a configuration for the carrier. The BS may receive a carrier failure report message from the UE, determine a need for a new carrier for the UE, and when needed, configure new carrier information for the UE. When it is determined in operation 1103 that the UE is not connected to the BS (one of RRC_IDLE, RRC_INACTIVE, or OUT-OF-COVERAGE), the UE may perform a carrier selection/reselection procedure in operation 1109. When it is determined that the multi-carrier usage condition is valid or the duplicate transmission performance condition is valid, the UE in an RRC_IDLE/RRC_INACTIVE state or the UE in an OUT-OF-COVERATE state may perform an operation of selecting/reselecting a carrier based on configuration of a system information message or configuration of a pre-configuration.

FIG. 11B illustrates an operation of the UE for suspending use of a carrier determined to have failed, while performing a carrier selection/reselection procedure. Referring to FIG. 11B, the UE may initiate a carrier failure handling procedure in operation 1151. In operation 1153, the UE may determine whether the UE is connected to the BS (RRC_CONNECTED). When the UE determines in operation 1153 that the UE is connected to the BS, the UE may perform a carrier failure reporting procedure in operation 1155. The carrier failure reporting procedure in operation 1155 may be the same as operation 905 described above with reference to FIG. 9A. The BS may receive a carrier failure report message from the UE, determine a need for a new carrier for the UE, and when needed, configure new carrier information for the UE. In an embodiment, when it is determined in operation 1153 that the UE is not connected to the BS (one of RRC_IDLE, RRC_INACTIVE, or OUT-OF-COVERAGE), the UE may suspend use of the carrier determined to have failed, and delete a configuration for the carrier. Also, the UE may perform a carrier selection/reselection procedure in operation 1159. When it is determined that the multi-carrier usage condition is valid or the duplicate transmission performance condition is valid, the UE in an RRC_IDLE/RRC_INACTIVE state or the UE in an OUT-OF-COVERATE state may perform an operation of selecting/reselecting a carrier based on configuration of a system information message or configuration of a pre-configuration. In another embodiment, after performing the carrier selection/reselection procedure in operation 1159, the UE may suspend use of the carrier determined to have failed, and delete a configuration for the carrier. In other words, based on FIG. 11A or 11B, the UE may determine whether to perform a reporting procedure for a carrier (failed carrier) determined to have failed, or may determine whether to perform a carrier selection/reselection procedure, based on the connection state with the BS. Also, the UE may determine the connection state with the BS, and when the UE is connected to the BS, may suspend use of the carrier (failed carrier) determined to have failed, and delete a configuration for the carrier, or when the UE is not connected to the BS, may suspend use of the carrier (failed carrier) determined to have failed, and delete a configuration for the carrier.

Figure 12A:
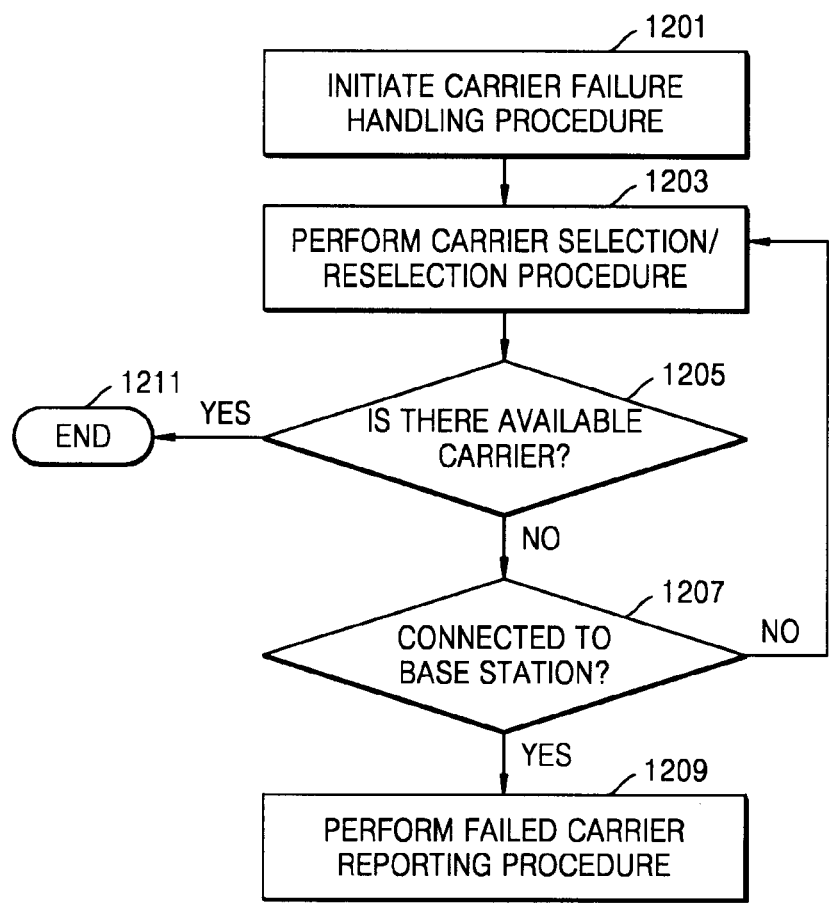
FIGS. 12A and 12B are diagrams for describing operations of a terminal for handling a failure of a sidelink carrier, according to an embodiment of the disclosure.
Figure 12B:
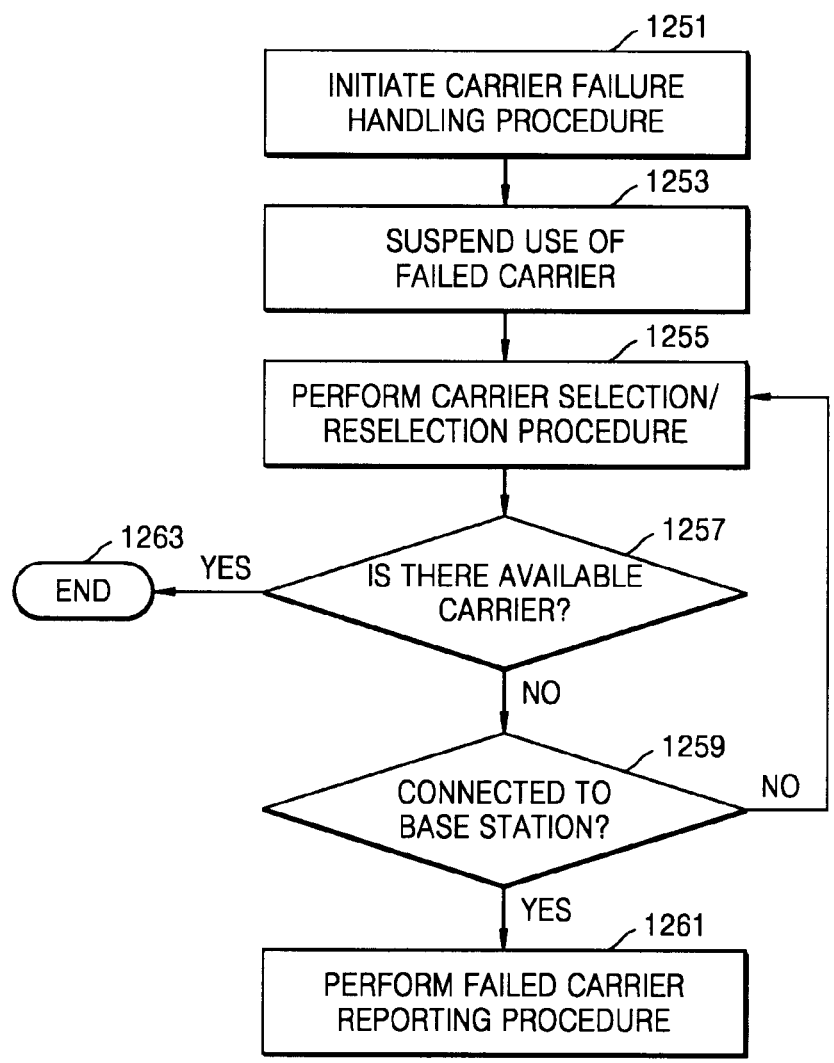

FIGS. 12A and 12B are diagrams for describing operations of the UE for handling a failure of an SL carrier, according to an embodiment of the disclosure.

According to an embodiment of the disclosure, carrier failure handling procedures of FIGS. 12A and 12B may correspond to the carrier failure handling procedures 809 and 859 of FIGS. 8A and 8B.

Referring to FIG. 12A, illustrated is an operation by which the UE determines a failure of a carrier, performs carrier selection/reselection, and then, when it is determined that no available carrier exists, reports the failure to the BS. FIG. 12A illustrates an operation by which the UE may determine to continue using a carrier determined to have failed, while performing a carrier failure handling procedure, or may suspend use of a carrier determined to have failed, while performing a reporting procedure for a carrier (failed carrier) determined to have failed. In an embodiment, the UE may initiate a carrier failure handling procedure in operation 1201. The UE may perform a carrier selection/reselection procedure in operation 1203. While performing the carrier selection/reselection procedure, in operation 1205, the UE may determine whether an available carrier exists. When it is determined that the available carrier exists according to the determination in operation 1205, the UE may proceed to operation 1211. In operation 1211, the UE may suspend use of a carrier determined to have failed. When it is determined in operation 1205 that no available carrier exists, in operation 1207, the UE may determine whether the UE is connected to the BS (RRC_CONNECTED). When it is determined in operation 1207 that the UE is connected to the BS, the UE may perform a carrier failure reporting procedure in operation 1209. The carrier failure reporting procedure in operation 1209 may be the same as operation 905 described above with reference to FIG. 9A. The UE may suspend use of a carrier determined to have failed. The BS may receive a carrier failure report message from the UE, determine a need for a new carrier for the UE, and when needed, configure new carrier information for the UE. When it is determined in operation 1207 that the UE is not connected to the BS (one of RRC_IDLE, RRC_INACTIVE, or OUT-OF-COVERAGE), the UE may perform operation 1203. That is, when it is determined that a multi-carrier usage condition is valid or the duplicate transmission performance condition is valid, the UE in an RRC_IDLE/RRC_INACTIVE state or the UE in an OUT-OF-COVERATE state may perform an operation of selecting/reselecting a carrier based on configuration of a system information message or configuration of a pre-configuration. In the case of operation 1211 in which it is determined in operation 1205 that the available carrier exists, or when a failure report message is transmitted to the BS in operation 1209 after it is determined in operation 1205 that no available carrier exists and it is determined in operation 1207 that the UE is connected to the BS, the UE may suspend use of a carrier (failed carrier) determined to have failed.

Referring to FIG. 12B, illustrated is an operation by which the UE determines a failure of a carrier, performs a carrier selection/reselection procedure, and then, when it is determined that no available carrier exists, reports the failure to the BS. FIG. 12B illustrates an operation of the UE for suspending use of a carrier determined to have failed, and performing a carrier failure handling procedure. In an embodiment, the UE may initiate a carrier failure handling procedure in operation 1251. In operation 1253, the UE may suspend use of a carrier determined to have failed. The UE may perform a carrier selection/reselection procedure in operation 1255. While performing the carrier selection/reselection procedure, in operation 1257, the UE may determine whether an available carrier exists. When it is determined that the available carrier exists according to the determination in operation 1257, the UE may proceed to operation 1263. When it is determined in operation 1257 that no available carrier exists, in operation 1259, the UE may determine whether the UE is connected to the BS (RRC_CONNECTED). When it is determined in operation 1259 that the UE is connected to the BS, the UE may perform a carrier failure reporting procedure in operation 1261. The carrier failure reporting procedure in operation 1261 may be the same as operation 905 described above with reference to FIG. 9A. The BS may receive a carrier failure report message from the UE, determine a need for a new carrier for the UE, and when needed, configure new carrier information for the UE. When it is determined in operation 1259 that the UE is not connected to the BS (i.e., when it is determined that the state is one of RRC_IDLE, RRC_INACTIVE, or OUT-OF-COVERAGE), the UE may perform operation 1255. In other words, based on FIG. 12A or 12B, the UE may determine whether an available carrier exists, when no available carrier exists, determine whether to perform a reporting procedure for a carrier (failed carrier) determined to have failed, based on the connection state with the BS, and determine whether to perform a carrier selection/reselection procedure based on validity of duplicate transmission. Also, the UE may suspend use of the carrier (failed carrier) determined to have failed, and perform a carrier selection/reselection procedure, may not suspend use of the carrier (failed carrier) determined to have failed, or may suspend use of the carrier (failed carrier) determined to have failed, after transmitting a failure report message to the BS.

Figure 13:
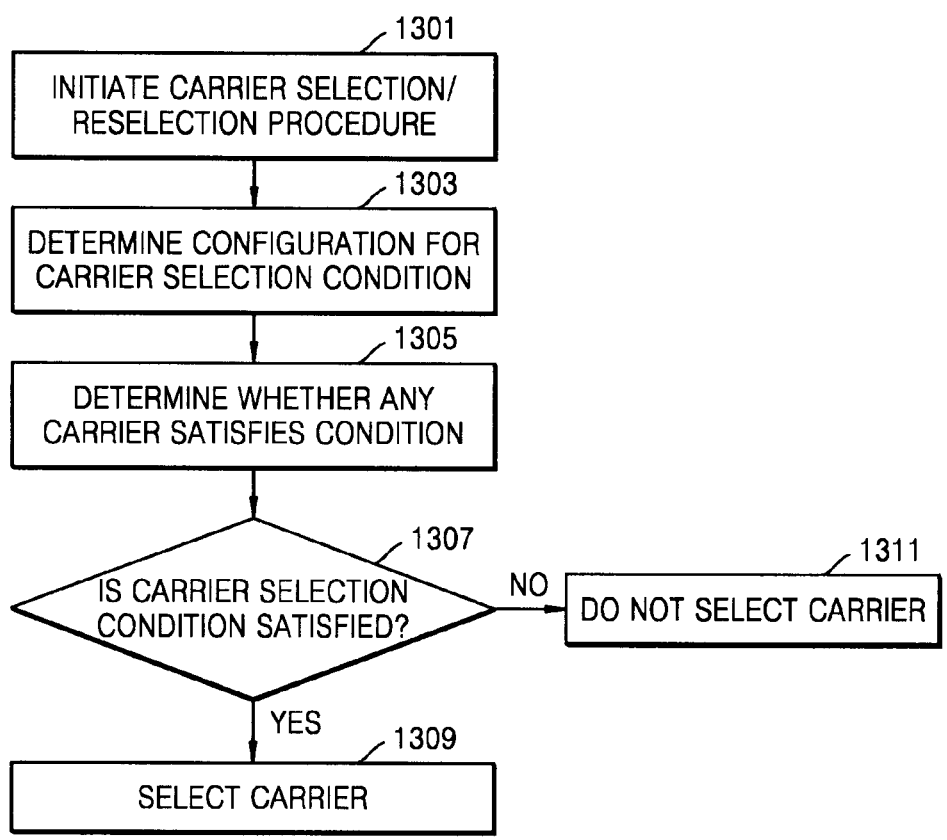
FIG. 13 is a diagram for describing operations of a terminal for processing carrier selection/reselection due to a failure of a sidelink carrier, according to an embodiment of the disclosure.

FIG. 13 is a diagram for describing operations of the UE for processing carrier selection/reselection due to a failure of an SL carrier, according to an embodiment of the disclosure.

According to an embodiment of the disclosure, a carrier selection/reselection procedure of FIG. 13 may correspond to the carrier selection/reselection procedures 909, 961, and 991 of FIGS. 9A, 9B, and 9C, the carrier selection/reselection procedures 1009 and 1057 of FIGS. 10A and 10B, the carrier selection/reselection procedures 1109 and 1159 of FIGS. 11A and 11B, and the carrier selection/reselection procedures 1203 and 1255 of FIGS. 12A and 12B.

Referring to FIG. 13, the UE may determine to initiate a carrier selection/reselection procedure in operation 1301. In operation 1303, the UE may determine whether a configuration for a carrier selection condition is obtained. The carrier selection condition may include at least one or a combination of a condition on which carrier is to be selected for a logical channel, a condition on which carrier is to be selected for an SL flow, and a condition on which carrier is to be selected for an SL bearer. The condition may be configured based on at least one or a combination of a channel congestion level, required reliability for an SL flow, required reliability for an SL bearer, a required delay budget for an SL flow, and a required delay budget for an SL bearer. The configuration of the carrier selection condition may be obtained through network configuration information or may be obtained through pre-configured information. The UE may select a carrier through which multi-carrier transmission or duplicate transmission is to be performed, according to the configuration of the carrier selection condition. Also, when the UE selects a new carrier for multi-carrier transmission or duplicate transmission-based unicast communication with a counterpart UE, the UE may select a SL carrier supported by the two UEs for the purpose of multi-carrier transmission or duplicate transmission, in consideration of capability information for SL band support (a supportable band list for SL band combination only or SL/Uu band combination) regarding the UE itself and the counterpart UE. In operation 1305, the UE may determine whether any carrier satisfies the carrier selection condition. When it is determined in operation 1307 that any carrier satisfies the carrier selection condition, the UE may select the carrier in operation 1309. When one or more carriers satisfying the carrier selection condition are selected according to the determination in operation 1309, the UE may determine one carrier by at least one or a combination of the following methods: (1) a method of randomly selecting a carrier from among a plurality of carriers; (2) a method of selecting a carrier having the lowest channel congestion level from among the plurality of carriers; (3) a method of selecting a carrier having the best SL signal quality (e.g., SL reference signal received power (SL-RSRP) from among the plurality of carriers; and (4) a method of selecting a carrier that first satisfies the carrier selection condition. When it is determined in operation 1307 that no carrier satisfies the carrier selection condition, the UE may not select a carrier in operation 1311.

In an embodiment, the UE may continue using a carrier determined to have failed, while performing the carrier selection/reselection procedure of FIG. 13. The use of the carrier determined to have failed may last until a new carrier is selected. In another embodiment, the UE may suspend use of the carrier determined to have failed, and perform the carrier selection/reselection procedure of FIG. 13.

An operation of a network which receives a SLFailureInformation message transmitted by the UE in the procedures of FIGS. 8 to 13 may include the following operations.

When the network receives the SLFailureInformation message, the network may configure carrier configuration information for the UE by selecting another carrier to be used for duplicate transmission and multi-carrier transmission, in consideration of information reported along with the SLFailureInformation message, SL capability information regarding the UE, capability information for SL band support (a supportable band list for SL band combination only or SL/Uu band combination) regarding the UE, available carrier information, a carrier channel congestion level situation, and carrier signal quality. The network may indicate the UE and other UEs to measure and report a channel congestion level situation for a carrier and a resource pool. The network may adjust a transmission parameter (e.g., carrier set information, a reference parameter for activating duplicate transmission, transmission power, a modulation and coding scheme (MCS) level, or the number of times of HARQ retransmission) for a carrier and a resource pool, and transmit configuration information regarding a new transmission parameter to the UE and the other UEs.

Figure 14A:
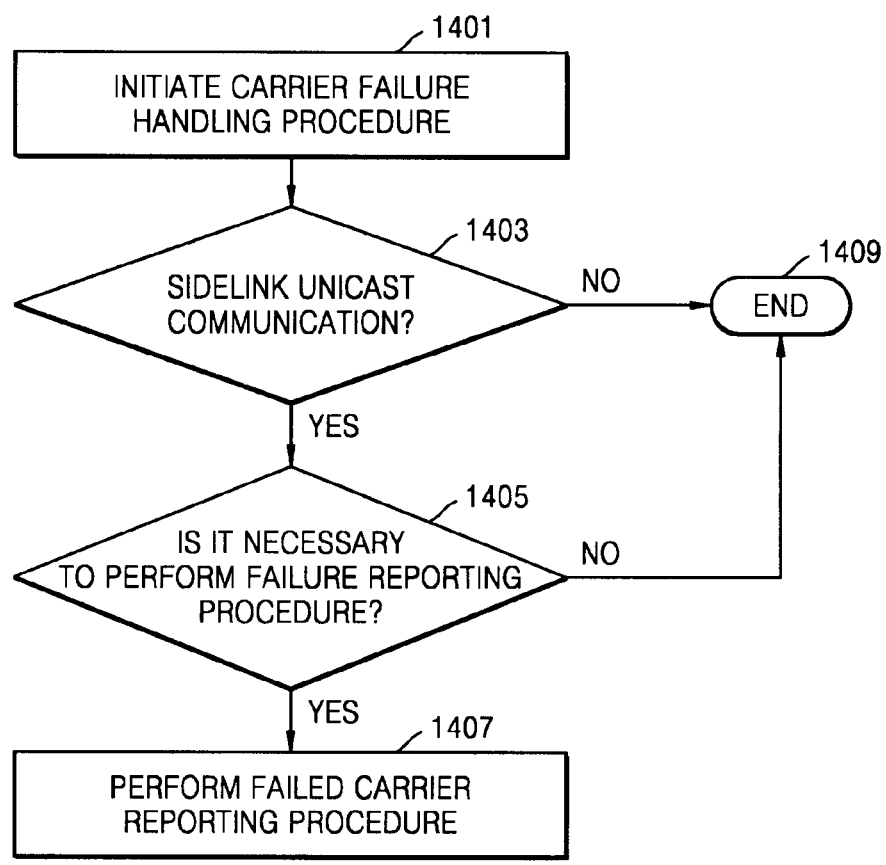
FIGS. 14A and 14B are diagrams for describing operations of a terminal for handling a failure of a sidelink carrier, according to an embodiment of the disclosure.
Figure 14B:
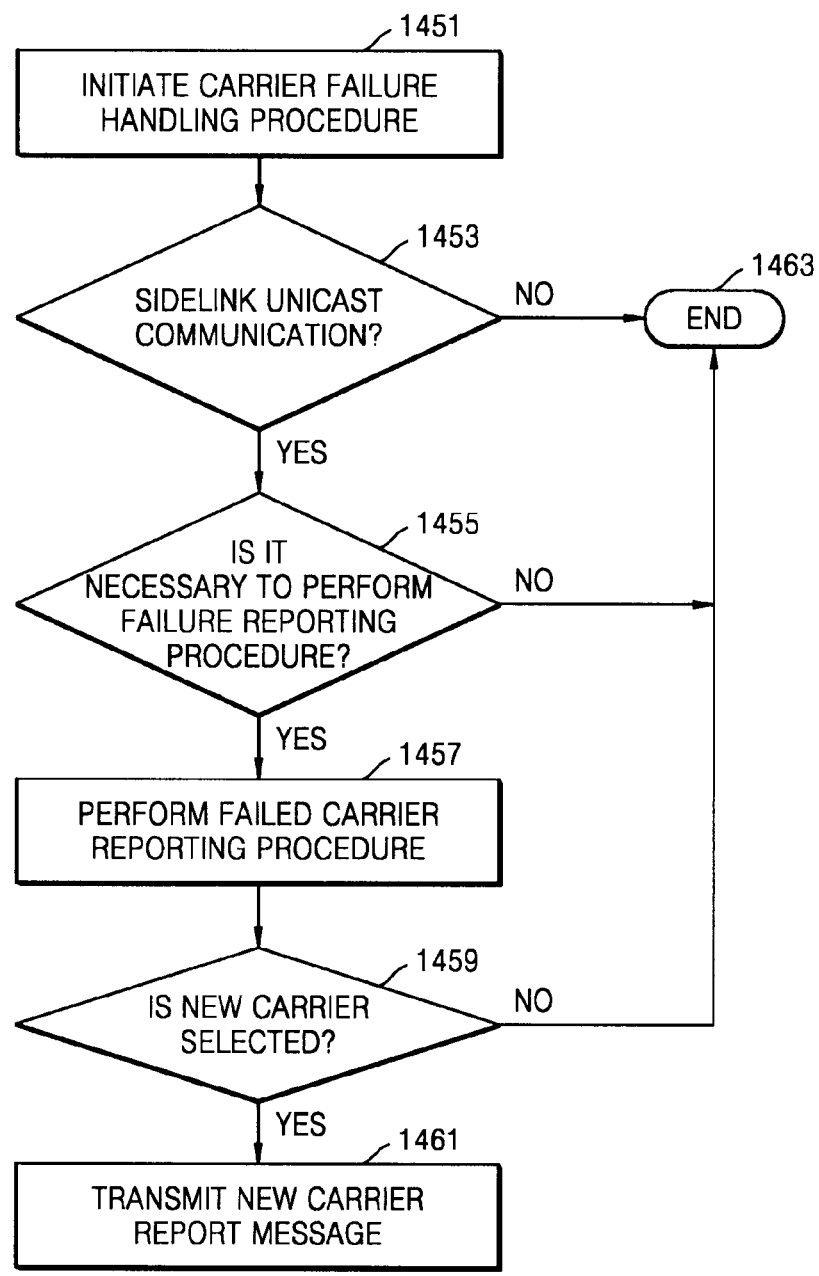

FIGS. 14A and 14B are diagrams for describing operations of the UE for handling a failure of an SL carrier, according to an embodiment of the disclosure.

According to an embodiment of the disclosure, carrier failure handling procedures of FIGS. 14A and 14B may correspond to the carrier failure handling procedures 809 and 859 of FIGS. 8A and 8B.

Referring to FIGS. 14A and 14B, illustrated is an operation by which the UE that has determined a failure of an SL carrier, while performing unicast-based data transmission (e.g., duplicate transmission and/or multi-carrier transmission) by using one or more SL carriers, notifies a counterpart UE in unicast communication of the failure of the carrier. In an embodiment, the procedures of FIGS. 14A and 14B may be performed when two UEs determine to suspend use of a carrier (failed carrier) determined to have failed, the carrier being used for unicast communication. In another embodiment, the procedures of FIGS. 14A and 14B may be performed when two UEs determine to handle an SL failure without suspending use of a carrier (failed carrier) determined to have failed, the carrier being used for unicast communication.

Referring to FIG. 14A, the UE may determine to initiate a carrier failure handling procedure in operation 1401. In operation 1403, the UE may determine whether a carrier determined to have failed is being used for unicast communication. When it is determined in operation 1403 that the carrier (failed carrier) determined to have failed is not used for unicast communication, the UE may proceed to operation 1409. When it is determined in operation 1403 that the carrier (failed carrier) determined to have failed is used for unicast communication, in operation 1405, the UE may determine whether it is necessary to perform a carrier failure reporting procedure with respect to the counterpart UE. In an embodiment, a condition for determining that it is necessary to perform a carrier failure reporting procedure with respect to the counterpart UE in operation 1405 may include whether a carrier corresponds to a non-primary carrier, according to the embodiment of FIG. 8A. In another embodiment, a condition for determining that it is necessary to perform a carrier failure reporting procedure with respect to the counterpart UE in operation 1405 may include whether there is at least one carrier that may be used for unicast communication between two UEs, according to the embodiment of FIG. 8B. When it is determined in operation 1405 to report the failure of the carrier to the counterpart UE, in operation 1407, the UE may perform a reporting procedure for the carrier determined to have failed. When it is determined in operation 1405 that it is unnecessary to report the failure of the carrier to the counterpart UE, the UE may proceed to operation 1409.

Referring to FIG. 14B, illustrated is an operation by which the UE that has determined a failure of a carrier performs a reporting procedure for the carrier (failed carrier) determined to have failed, and when there is a newly selected carrier for the purpose of unicast communication, notifies a counterpart UE in unicast communication of information regarding the new carrier. In an embodiment, the UE may determine to initiate a carrier failure handling procedure in operation 1451. In operation 1453, the UE may determine whether a carrier determined to have failed is used for unicast communication. When it is determined in operation 1453 that the carrier (failed carrier) determined to have failed is not used for unicast communication, the UE may proceed to operation 1463. When it is determined in operation 1453 that the carrier (failed carrier) determined to have failed is used for unicast communication, in operation 1455, the UE may determine whether it is necessary to perform a carrier failure reporting procedure with respect to the counterpart UE. In an embodiment, a condition for determining that it is necessary to perform a carrier failure reporting procedure with respect to the counterpart UE in operation 1455 may include whether a carrier corresponds to a non-primary carrier, according to the embodiment of FIG. 8A. In another embodiment, a condition for determining that it is necessary to perform a carrier failure reporting procedure with respect to the counterpart UE in operation 1455 may include whether there is at least one carrier that may be used for unicast communication between two UEs, according to the embodiment of FIG. 8B. When the UE determines in operation 1455 to report the failure of the carrier to the counterpart UE, in operation 1457, the UE may perform a reporting procedure for the carrier determined to have failed. When the UE determines in operation 1455 that it is unnecessary to report the failure of the carrier to the counterpart UE, the UE may proceed to operation 1463. In operation 1459, the UE may determine whether a new carrier is configured to multi-carrier transmission or duplicate transmission-based unicast communication with the counterpart UE. When the UE selects a new carrier for multi-carrier transmission or duplicate transmission-based unicast communication with a counterpart UE, the UE may select a SL carrier supported by the two UEs for the purpose of multi-carrier transmission or duplicate transmission, in consideration of capability information for SL band support (a supportable band list for SL band combination only or SL/Uu band combination) regarding the UE itself and the counterpart UE. When it is determined in operation 1459 that a new carrier is configured, in operation 1461, the UE may transmit, to the counterpart UE, a message notifying information regarding the new carrier. When it is determined in operation 1459 that a new carrier is not configured, the UE may proceed to operation 1463.

An embodiment of a SLFailureInformationSidelink message configured by the UE in operations 1407 and 1457 and transmitted to the counterpart UE in unicast communication may be shown in [Table 6].

TABLE 6

- SLFailureInformationSidelink
The SLFailureInformationSidelink message is used to provide information regarding failures detected by the UE, e.g. radio link failure for one of the SL RLC entities configured with SL PDCP duplication or e.g. radio link failure for one of SL RLC entities configured with SL PDCP duplication.
Signalling radio bearer: SL-SRB
RLC-SAP: AM
-- ASN1START
SLFailureInformationSidelink ::=        SEQUENCE {
    criticalExtensions                  CHOICE {
        failureInformation              FailureInformationSidelink-IEs,
        criticalExtensionsFuture                                            SEQUENCE { }
}
FailureInformationSidelink-IEs ::=      SEQUENCE {
    slfailureInfoRLC-Bearer             SLFailureInfoRLC-Bearer             OPTIONAL,
    lateNonCriticalExtension            OCTET STRING                        OPTIONAL,
    nonCriticalExtension                SEQUENCE { }                        OPTIONAL
}
SLFailureInfoRLC-Bearer ::=SEQUENCE {
    slrbIdentity                        INTEGER (1..N),
    carrierFreqID                       ARFCN-ValueNR,
    failureType                         ENUMERATED {rlc-failure, spare3, spare2, spare1}
}
-- ASN1STOP The SLFailureInformationSidelink message in operations 1407 and 1457 may include at least one or a combination of pieces of information in [Table 7].

TABLE 7

- SL logical channel group identity
  - In SLFailureInformationSidelink message, UE can report sidelink LCGID of the failing RLC bearer to peer UE.

TABLE 7-continued

- SL logical channel identity
    - In SLFailureInformationSidelink message, UE can report sidelink logical channel identity of the failing RLC bearer to peer UE.

According to an embodiment of the disclosure, the SLFailureInformationSidelink message in operations 1407 and 1457 may be used as a message notifying transmission suspension of the carrier determined to have failed. In other words, based on FIG. 14A or 14B, the UE may determine whether to perform a reporting procedure for the carrier (failed carrier) determined to have failed, based on whether an SL unicast connection is made and whether a failure reporting procedure is necessary. Also, the UE may select a new carrier after reporting the carrier (failed carrier) determined to have failed, and may transmit a new carrier report message. When the UE selects a new carrier for multi-carrier transmission or duplicate transmission-based unicast communication with a counterpart UE, the UE may select a SL carrier supported by the two UEs for the purpose of multi-carrier transmission or duplicate transmission, in consideration of capability information for SL band support (a supportable band list for SL band combination only or SL/Uu band combination) regarding the UE itself and the counterpart UE.

Some or all of the embodiments shown FIGS. 8A to 14B may be combined, and the UE may operate based on the combined embodiments.

Figure 15A:
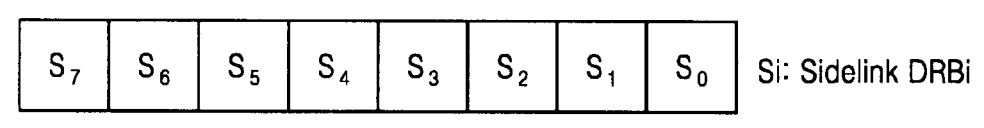

FIGS. 15A and 15B are diagrams illustrating a format of an MAC CE, according to an embodiment of the disclosure.

Referring to FIG. 15A, according to an embodiment of the disclosure, the carrier failure report message in operations 1407 and 1457 described above with reference to FIGS. 14A and 14B may be transmitted in a PC5 MAC CE format. For example, when it is assumed that duplicate transmission may be performed on 8 carriers, SL DRBi (Si) may indicate carrier mapping corresponding to an SL radio bearer. A Si value may be configured as 0 or 1, 0 may indicate carrier failure, and 1 may indicate carrier active.

According to an embodiment, signaling for notifying the counterpart UE of transmission suspension of the carrier may be transmitted in a PC5 MAC CE. For example, when it is assumed that duplicate transmission may be performed on 8 carriers, Si may indicate carrier mapping corresponding to an SL radio bearer. The Si value may be configured as 0 or 1, 0 may indicate carrier suspension, and 1 may indicate carrier active.

Referring to FIG. 15B, according to an embodiment of the disclosure, a carrier failure report message may indicate mapping of a carrier corresponding to a signaling radio bearer (SRB) corresponding to PC5-RRC, an SRB corresponding to PC5-S signaling, or the like, in addition to an SL data radio bearer (DRB). The carrier failure report message may indicate carrier failure when a PC5-RRC field value is configured as 0, and may indicate carrier active when the PC5-RRC field value is configured as 1. The carrier failure report message may indicate carrier failure when a PC5-S field value is configured as 0, and may indicate carrier active when the PC5-S field value is configured as 1.

According to an embodiment of the disclosure, a message notifying transmission suspension of the carrier may indicate mapping of a carrier corresponding to an SRB corresponding to PC5-RRC, an SRB corresponding to PC5-S signaling, or the like, in addition to an SL DRB. The message notifying transmission suspension of the carrier may indicate carrier suspension when a PC5-RRC field value is configured as 0, and may indicate carrier active when the PC5-RRC field value is configured as 1. The message notifying transmission suspension of the carrier may indicate carrier suspension when a PC5-S field value is configured as 0, and may indicate carrier active when then PC5-S field value is configured as 1.

An SLFailureInformationSidelink message, a PC5 MAC CE for reporting a failure of a carrier, and a PC5 MAC CE for notifying transmission suspension of a carrier may be transmitted through any available carrier used between two UEs or may be transmitted through a primary carrier. Different PC5 logical channel IDs (PC5 LCIDs) may be configured for the PC5 MAC CE for reporting the failure of the carrier and the PC5 MAC CE for notifying transmission suspension of the carrier.

The methods according to the claims of the disclosure or the embodiments described herein may be implemented in hardware or software, or in a combination of hardware and software.

When the methods are implemented in software, a computer-readable recording medium having one or more programs (software modules) stored therein may be provided. One or more programs stored in the computer-readable storage medium are configured to be executable by one or more processors in an electronic device. The one or more programs include instructions that cause the electronic device to execute the methods according to the claims of the disclosure or the embodiments described herein.

The programs (e.g., software modules or software) may be stored in random access memory (RAM), non-volatile memory including flash memory, read-only memory (ROM), electrically erasable programmable read-only memory (EEPROM), a magnetic disc storage device, a compact disc-ROM (CD-ROM), a digital versatile disc (DVD), another type of optical storage device, or a magnetic cassette. Alternatively, the programs may be stored in a memory including any combination of some or all of the aforementioned storage media. Also, each of the memories may include a plurality of memories.

Also, the programs may be stored in an attachable storage device which is accessible via a communication network, such as the Internet, an intranet, a local area network (LAN), a wireless LAN (WLAN), or a storage area network (SAN), or a combination thereof. Such a storage device may access, through an external port, an apparatus performing the embodiments of the disclosure. Furthermore, a separate storage device on the communication network may access the apparatus performing the embodiments of the disclosure.

In the aforementioned embodiments of the disclosure, components included in the disclosure are expressed in a singular or plural form according to the embodiments of the disclosure. However, the singular or plural form is appropriately selected for convenience of descriptions and the disclosure is not limited thereto. As such, a component expressed in a plural form may also be configured as a single component, and a component expressed in a singular form may also be configured as plural components.

Although specific embodiments have been described in the detailed description of the disclosure, various modifications may be made without departing from the scope of the disclosure. Therefore, the scope of the disclosure should not be limited to the aforedescribed embodiments of the disclosure and should be determined by the appended claims and the equivalents thereof.

The invention claimed is:

1. A method performed by a terminal in a wireless communication system, the method comprising:
   performing a sidelink transmission associated with a plurality of sidelink carriers;
   identifying whether all of the plurality of sidelink carriers are unavailable, based on a hybrid automatic repeat request (HARQ) operation;
   in case that all of the plurality of sidelink carriers are unavailable, identifying a detection of a sidelink radio link failure (RLF); and
   transmitting, to a base station, information associated with the sidelink RLF.

2. The method of claim 1, further comprising:
   in case that at least one of the plurality of sidelink carriers is available and that a sidelink carrier failure occurs in a sidelink carrier, transmitting, to the base station, information associated with the sidelink carrier failure.

3. The method of claim 2, wherein the information associated with the sidelink carrier failure includes a parameter indicating a destination identity for the sidelink carrier failure and a parameter indicating the sidelink carrier associated with the sidelink carrier failure.

4. The method of claim 1, further comprising:
   in case that at least one of the plurality of sidelink carriers is available and that a sidelink carrier failure occurs in a sidelink carrier, performing a carrier selection or reselection procedure.

5. The method of claim 4, wherein the carrier selection or reselection procedure is performed based on configuration information for a carrier selection or reselection.

6. The method of claim 5, wherein the configuration information for the carrier selection or reselection is received from the base station.

7. The method of claim 5, wherein the configuration information for the carrier selection or reselection includes information associated with a logical channel and information associated with a channel busy ratio (CBR).

8. The method of claim 7, wherein the performing of the carrier selection or reselection procedure comprises:
   selecting a carrier with a lowest CBR, from among one or more candidate carriers for the carrier selection or reselection.

9. The method of claim 4, wherein the carrier selection or reselection procedure is associated with multiple carrier transmission related capability information, for unicast.

10. The method of claim 1, wherein the terminal is in a radio resource control (RRC) connected state.

11. A terminal in a wireless communication system, the terminal comprising:
    a transceiver; and
    at least one processor coupled with the transceiver and configured to:
      perform a sidelink transmission associated with a plurality of sidelink carriers;
      identify whether all of the plurality of sidelink carriers are unavailable, based on a hybrid automatic repeat request (HARQ) operation;
      in case that all of the plurality of sidelink carriers are unavailable, identify a detection of a sidelink radio link failure (RLF); and
      transmit, to a base station, information associated with the sidelink RLF.

12. The terminal of claim 11, wherein the at least one processor is further configured to:
    in case that at least one of the plurality of sidelink carriers is available and that a sidelink carrier failure occurs in a sidelink carrier, transmit, to the base station, information associated with the sidelink carrier failure.

13. The terminal of claim 12, wherein the information associated with the sidelink carrier failure includes a parameter indicating a destination identity for the sidelink carrier failure and a parameter indicating the sidelink carrier associated with the sidelink carrier failure.

14. The terminal of claim 11, wherein the at least one processor is further configured to:
    in case that at least one of the plurality of sidelink carriers is available and that a sidelink carrier failure occurs in a sidelink carrier, perform a carrier selection or reselection procedure.

15. The terminal of claim 14, wherein the carrier selection or reselection procedure is performed based on configuration information for a carrier selection or reselection.

* * * * *